US011243613B2

(12) United States Patent
Yamamoto et al.

(10) Patent No.: US 11,243,613 B2
(45) Date of Patent: Feb. 8, 2022

(54) SMART TUTORIAL FOR GESTURE CONTROL SYSTEM

(71) Applicants: Honda Motor Co., Ltd., Tokyo (JP); Edge 3 Technologies LLC, Phoenix, AZ (US)

(72) Inventors: Stuart Masakazu Yamamoto, La Mirada, CA (US); Tarek A. El Dokor, Phoenix, AZ (US)

(73) Assignees: HONDA MOTOR CO., LTD., Tokyo (JP); EDGE 3 TECHNOLOGIES LLC, Phoenix, AZ (US)

(*) Notice: Subject to any disclaimer, the term of this patent is extended or adjusted under 35 U.S.C. 154(b) by 0 days.

(21) Appl. No.: 16/525,302

(22) Filed: Jul. 29, 2019

(65) Prior Publication Data
US 2019/0354192 A1 Nov. 21, 2019

Related U.S. Application Data

(63) Continuation of application No. 14/874,175, filed on Oct. 2, 2015, now Pat. No. 10,409,382, which is a (Continued)

(51) Int. Cl.
*G06F 3/01* (2006.01)
*G06F 3/0488* (2013.01)
(Continued)

(52) U.S. Cl.
CPC .......... *G06F 3/017* (2013.01); *G06F 3/04842* (2013.01); *G06F 3/04883* (2013.01); *G06F 3/167* (2013.01); *G06K 9/00389* (2013.01)

(58) Field of Classification Search
CPC .. G06F 3/04842; G06F 3/167; G06F 3/04883; G06F 3/017; G06K 9/00389
See application file for complete search history.

(56) References Cited

U.S. PATENT DOCUMENTS 6,324,453 B1   11/2001  Breed et al.
6,894,714 B2    5/2005  Gutta et al.
(Continued)

FOREIGN PATENT DOCUMENTS

DE   102007025352   12/2008
EP        2213501    4/2010
EP        2518447   10/2012

OTHER PUBLICATIONS

"BMW Shows Connected Passenger Display Concept with Gesture Control" http://telematicsnews.info/2011/02/14/bmw-shows-connected-passenger-display-concept-with-gesture-control_f2143/; dated Feb. 14, 2011, 2 pages.
(Continued)

*Primary Examiner* — Daniel Samwel
(74) *Attorney, Agent, or Firm* — Rankin, Hill & Clark LLP

(57) ABSTRACT

A method includes monitoring a plurality of system inputs, and detecting a behavioral pattern performed by a user and associated with the plurality of system inputs, When the behavioral pattern is detected, the method includes associating, in a memory, a gesture with at least one action, the at least one action being determined by the plurality of system inputs, and, upon detecting the gesture, executing the action associated with the gesture.

20 Claims, 20 Drawing Sheets

Related U.S. Application Data continuation-in-part of application No. 14/490,591, filed on Sep. 18, 2014, now Pat. No. 10,466,657, which is a continuation-in-part of application No. 14/244,790, filed on Apr. 3, 2014, now Pat. No. 9,342,797.

(60) Provisional application No. 62/063,340, filed on Oct. 13, 2014.

(51) Int. Cl.
*G06K 9/00* (2006.01)
*G06F 3/16* (2006.01)
*G06F 3/0484* (2013.01)

(56) References Cited

U.S. PATENT DOCUMENTS

| | | | |
|---|---|---|---|
| 7,554,444 B2 | 6/2009 | Ravishankar | |
| 7,770,136 B2 | 8/2010 | Beeck et al. | |
| 8,009,025 B2 | 8/2011 | Engstrom et al. | |
| 8,051,024 B1 | 11/2011 | Bererton et al. | |
| 8,135,511 B2 | 3/2012 | Demirdjian et al. | |
| 8,140,344 B2 | 3/2012 | Kameyama | |
| 8,145,594 B2 | 3/2012 | Geisner et al. | |
| 8,378,970 B2 | 2/2013 | Nishida et al. | |
| 8,390,592 B2 | 3/2013 | Grundman et al. | |
| 8,903,593 B1 | 12/2014 | Addepalli et al. | |
| 2004/0193413 A1* | 9/2004 | Wilson | H04N 13/128 704/243 |
| 2005/0267676 A1 | 12/2005 | Nezu et al. | |
| 2006/0279528 A1 | 12/2006 | Schobben et al. | |
| 2008/0125941 A1 | 5/2008 | Mitteer | |
| 2009/0278915 A1 | 11/2009 | Kramer et al. | |
| 2010/0014711 A1 | 1/2010 | Camhi et al. | |
| 2010/0106366 A1 | 4/2010 | Lehomme et al. | |
| 2010/0208038 A1 | 8/2010 | Kutliroff et al. | |
| 2010/0274480 A1 | 10/2010 | McCall et al. | |
| 2010/0306712 A1 | 12/2010 | Snook et al. | |
| 2011/0196571 A1 | 8/2011 | Foladare et al. | |
| 2011/0286676 A1 | 11/2011 | El Dokor | |
| 2012/0057779 A1 | 3/2012 | El Dokor | |
| 2012/0327232 A1 | 12/2012 | Yang et al. | |
| 2013/0030811 A1 | 1/2013 | Olleon et al. | |
| 2013/0054496 A1* | 2/2013 | Marianetti, II | G06N 20/00 706/12 |
| 2013/0066526 A1 | 3/2013 | Mondragon et al. | |
| 2013/0074186 A1 | 3/2013 | Muttik | |
| 2013/0144462 A1 | 6/2013 | Ricci | |
| 2013/0204457 A1 | 8/2013 | King et al. | |
| 2013/0222329 A1* | 8/2013 | Larsby | G06F 3/04886 345/174 |
| 2013/0261871 A1 | 10/2013 | Hobbs | |
| 2013/0339027 A1 | 12/2013 | El Dokor et al. | |
| 2014/0058584 A1 | 2/2014 | Weng et al. | |
| 2014/0114896 A1* | 4/2014 | Hawkins | G06N 3/063 706/46 |
| 2014/0129075 A1 | 5/2014 | Carleton | |
| 2014/0278047 A1 | 9/2014 | Bahl et al. | |
| 2015/0130743 A1* | 5/2015 | Li | G06F 3/017 345/174 |
| 2015/0145995 A1 | 5/2015 | Shahraray et al. | |
| 2015/0312404 A1* | 10/2015 | Abramson | H04W 8/02 455/418 |
| 2016/0224836 A1 | 8/2016 | Appel et al. | |
| 2018/0111552 A1* | 4/2018 | Neiswander | B60Q 9/008 |

OTHER PUBLICATIONS

Website: http://www.e90post.com/forums/showthread.php?t_594473 "BMW Innovation Days Highlight Future BMW Technologies", 39 pages.

Website: http://www.engadget.com/2012/01/15/mercedes-benz-gesture-control-concept-is-dicey/, "Mercedez-Benz gesture control concept is DICEy", 10 pages.

Website: http://paultan.org/2011/10/13/bmw-experiments-with-gesture-recognition-simple-hand-movements-to-control-simple-idrive-functions/, "BMW experiments with gesture recognition—simple hand movements to control simple iDrive functions", 9 pages.

Alabaster, J.: "Audi Shows Gesture-Driven, Three-Panel, Heads-Up Dashboard Display" http//www.pcworld.com/article/247783/audi_shows_gesturedriven_threepanel_headsup_dashboard)display.html; dated Jan. 10, 2012.

Ml. Bordegoni et al., EUROGRAPHICS, "A Dynamic Gesture Language and Graphical Feedback for Interaction in a 3D User Interface", vol. 12, No. 3, 1993, pp. C1-C11.

Enrico Herrman et al., "Hand-Movement-Based In-Vehicle Driver/Front-Seat Passenger Discrimination for Centre Console Controls", dated Feb. 8, 2010, 9 pages.

"Jason" (User on Internet Forum): "BMW Innovation Days Highlight Future BMW Technologies" http://www.e90post.com/forums/showthread.php?t=594473, Oct. 5, 2011, 39 pages.

C. Keskin et al., Boğziçi University, "Real Time Gestural Interface for Generic Applications", 4 pages.

Lavrinc, D.: "Mercedes-Benz Gesture Control Concept is DICEy", http://www.engadget.com/2012/01/15/mercedes-benz-gesture-control-concept-is-dicey/, Jan. 15, 2012, 10 pages.

Schmidt, "Implicit Human Computer Interaction Through Context," Personal Technologies, vol. 4, No. 2-3, pp. 191-199, Springer-Verlag London Ltd., 2000.

Tan, P.: "BMW Experiments with Gesture Recognition—Simple Hand Movements to Control Simple iDrive Functions" http://paultan.org/2011/10/13/bmw-experiments-with-gesture-recognitionsimple-hand-movements-to-control-simple-idrive-functions/, Oct. 13, 2011, 9 pages.

M. Zobl et al., GW 2003, Ed.: A. Camurri, LNCS 2915 Springer Verlag, "Gesture Components for Natural Interaction with In-Car Devices", 12 pages.

European Office Action S/N 15716684.4 dated Dec. 12, 2018, 7 pages.

International Search Report and Written Opinion dated Jun. 23, 2015 for Application No. PCT/US2015/023992.

* cited by examiner

SMART TUTORIAL FOR GESTURE CONTROL SYSTEM

CROSS-REFERENCE TO RELATED APPLICATIONS

This application is a continuation of and claims priority to U.S. Non-Provisional patent application Ser. No. 14/874,175 entitled "SMART TUTORIAL FOR GESTURE CONTROL SYSTEM", filed on Oct. 2, 2015, which is a continuation-in-part (CIP) of U.S. Non-Provisional patent application Ser. No. 14/490,591 entitled "SYSTEMS AND METHODS FOR GLOBAL ADAPTATION OF AN IMPLICIT GESTURE CONTROL SYSTEM", filed on Sep. 18, 2014; and a CIP of U.S. Non-Provisional patent application Ser. No. 14/244,790 entitled "SYSTEMS AND METHODS FOR THE DETECTION OF IMPLICIT GESTURES", filed on Apr. 3, 2014; and claims priority to U.S. Provisional/Patent Application, Ser. No. 62/063,340 entitled "SMART TUTORIAL FOR GESTURE CONTROL SYSTEM", filed on Oct. 13, 2014; the entirety of the above-noted application(s) are incorporated by reference herein.

FIELD OF THE INVENTION

The present disclosure generally relates to a method and system for automobile cockpit analytics and, more particularly, to methods and systems for recognizing gestures made within a vehicle.

BACKGROUND

Modern speech and gesture systems often demand a user's attention, drawing their eyes away from critical tasks and, sometimes, affecting their behavior as they engage in activities as simple as watching TV or as complex as operating a vehicle. This demand placed on the user's attention taxes the cognitive load that is associated with various actions required of a user, thereby making it difficult to multitask safely while operating such systems during operation of a vehicle, for instance. Furthermore, current systems often require specific and un-intuitive gestures or voice commands to be performed by a user to enable a desired function. Such un-intuitive gesture and voice commands further tax the cognitive load placed on a user as they must turn their focus to remembering and performing the required gesture or voice command to enable the desired feature. This increase cognitive load can reduce a user's ability to focus on the current activity at hand.

Cognitive load placed on a user can represent the combined impact of several factors. One such factor can be an intrinsic component of the cognitive load (I), which can depend partially or completely on the complexity and difficulty level associated with a task, and the associated memory that needs to be allocated to it. Another factor can be the germane load (G) that is associated with learning a new skill. Finally, an extraneous factor (E), such as how information is presented to a user, can affect cognitive loading, particularly where a complex series of mental schemata is required to represent the information in the brain. The total cognitive load (T) is then the sum of these factors, I, G, and E. These factors illustrate why cognitive loading is so high in existing systems. Both the germane and conscious efforts involved in performing the learning process of a modern speech control system can be hampered by presenting the user with a discouraging experience. More importantly, modern user interface systems can require navigation through multiple layers, such that the extraneous load placed on the users becomes very challenging. Therefore, adding an additional primary activity that is required to access the layered data can force the cognitive schema that is associated with all the different user interface layers to become significantly challenging to users.

Additionally, modern voice and gesture systems are generally cumbersome to use and slow to react. Furthermore, modern speech and gesture systems are often too primitive or clumsy to actually discern the true intention of the user. This inability of current voice and gesture systems to efficiently and easily recognize the intention of the user can result in not only an increase in the cognitive load of the user, but also in frustration and distraction, potentially increasing the danger associated with performing certain acts while simultaneously operating a vehicle. This increase in applied cognitive load is a major problem that has resulted in slow and difficult adoption and integration of voice and gesture systems into the daily lives of consumers and users.

Finally, complex modern devices, such as automobiles, present a user with a multitude of distractions. The more that technology advances, with more options being presented to users, the more the cognitive load of a user, such as a driver of an automobile, is increased. This increase in cognitive load, combined with the additional distractions associated with operating multiple functions while driving, can result in the user being substantially distracted when performing operations other than those purely related to operating the vehicle.

The above issues demonstrate the need for a speech and gesture system and method that can be implemented without increasing the cognitive load placed on a user when performing an operation, such as an operating a vehicle.

SUMMARY

In one embodiment, a method includes monitoring a plurality of system inputs, detecting a behavioral pattern performed by a user and associated with the plurality of system inputs, and, when the behavioral pattern is detected, associating, in a memory, a gesture with at least one action, the at least one action being determined by the plurality of system inputs. The method includes, upon detecting the gesture, executing the action associated with the gesture. In another embodiment, a method for developing customized gestures in an implicit gesture control system based on user behavior includes monitoring a plurality of actions performed by a user, detecting behavioral patterns associated with the plurality of actions performed by the user, and correlating a series of system outputs to the detected behavioral patterns. The method includes instructing the user to perform a suggested gesture, the suggested gesture associated with the series of system outputs, executing the series of system outputs when the user performs the suggested gesture, and instructing the user to accept or reject the executed series of system outputs associated with the suggested gesture.

In another embodiment, a learning tutorial system includes a processor, the processor in communication with a plurality of sensors coupled to a vehicle. The processor is configured to perform the steps of monitoring a plurality of system inputs, detecting behavioral patterns associated with the plurality of system inputs, prompting a user to perform a gesture, the gesture associated with the detected behavioral patterns, and executing an action associated with the gesture when the gesture is performed by the user.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Additionally, as this disclosure is directed to an implicit gesture learning system 100 and method, it should be recognized that "gesture" can designate any type of potential input, including, but not limited to, hand movements, body movements, spoken words, or various other bio-metric observations of a user or other actions or activities undertaken by a user, whether intentional or unintentional.

In one embodiment, the present technology can be directed to a system and method for reducing the cognitive load of motor vehicle operators. Although, it should be known that the systems and methods described herein can be used to reduce the cognitive load of users in challenging environments other than motor vehicles. The user's cognitive load can be reduced via systems and methods that learn and constantly improve and adapt to the users behavior.

Figure 1:
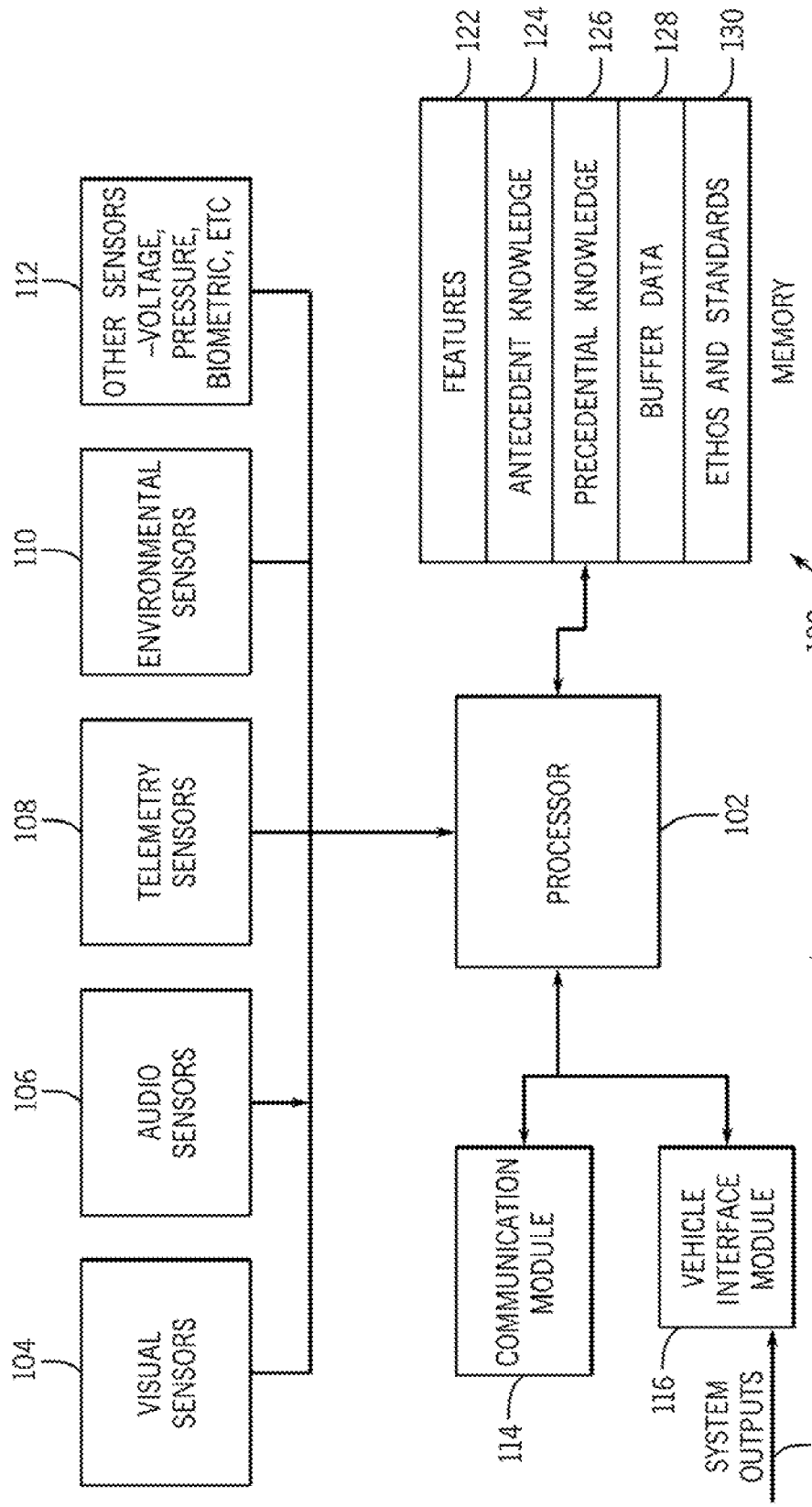
FIG. 1 is a block diagram illustrating functional components of an embodiment of an implicit gesture learning system.

FIG. 1 illustrates a possible embodiment of an implicit gesture learning system 100. The implicit gesture learning system 100 can contain a processor 102. The processor 102 can have multiple I/O ports to accept information from multiple systems in the vehicle. The processor 102 can also be configured to implement processes such as an implicit gesture learning process 200 or an implicit gesture control process 450 which are discussed in more detail below. The processor 102 can also be configured to implement other processes as are necessary for the operation of the herein described system and method. The implicit gesture learning system 100 can include multiple sensor devices. Non-limiting examples of possible sensing devices include visual sensors 104. Visual sensors 104 can be a charge-coupled devices ("CCD") or complimentary metal oxide semiconductor ("CMOS")-based devices. Alternatively, the visual sensors 104 can be stereoscopic sensors. The visual sensors 104 can also be one or more infrared (IR) type sensors that may be mounted about an interior of a vehicle. In one embodiment, the implicit gesture learning system 100 can contain multiple types of visual sensors 104. The visual sensors 104 can be coupled to a vehicle to view the passenger compartment of the vehicle. In one embodiment, multiple visual sensors 104 can be positioned to observe separate portions or areas of the passenger compartment of the vehicle. The visual sensors 104 can also be coupled to the vehicle such that the visual sensors 104 have a field of view that is all or partially outside the vehicle. In one embodiment, multiple visual sensors 104 can be coupled to the vehicle to provide a field of view outside of the vehicle that provides a 360 degree viewing angle outside of the vehicle. However, the visual sensors 104 can be coupled to provide a viewing angle less than 360 degrees. The visual sensors 104 can be used to detect visual objects both inside and outside of the vehicle. In one embodiment, the visual sensors 104 can be used to detect an explicit gesture of a driver or other occupant in a vehicle. In a further embodiment, the visual sensors 104 can be used to detect implicit gestures of a driver or other occupant in a vehicle.

The implicit gesture learning system can also contain audio sensors 106. The audio sensors 106 can be mono or stereo microphones. The audio sensors 106 can also contain noise cancellation or active noise reduction (ANR) technology to filter road and engine noise. In one embodiment, the audio sensors 106 can be located inside the passenger compartment of a vehicle. Alternatively, the audio sensors can also be located outside of the passenger compartment of a vehicle. In one embodiment, the audio sensors 106 can be located inside the passenger compartment of a vehicle and can be used to detect an audio command of a driver or other occupant of a vehicle.

The implicit gesture learning system 100 can also contain telemetry sensors 108. Non-limiting examples of telemetry sensors 108 can include weather sensors, such as temperature or humidity sensors. The telemetry sensors 108 can also include traffic condition sensors. Telemetry sensors 108 can also include accelerometers or other sensors configured to measure a configuration, attitude, position, speed, velocity, orientation, and the like. In one embodiment, a vehicle can include multiple telemetry sensors of varying types as required. Additionally, the gesture system can also contain separate environmental sensors 110. Non-limiting examples of environmental sensors 110 can include illumination sensors, wind sensors, or other environmental sensors 110 configured to measure one or more environmental conditions either outside or inside the vehicle.

The implicit gesture learning system 100 can also contain supplementary sensors 112 as needed. Non-limiting examples of supplementary sensors can include pressure sensors, biometric sensors, voltage sensors, current sensors, etc. The supplementary sensors 112 can be used to supplement the other sensors of the implicit gesture learning system 100 by providing more detailed information where needed.

The processor 102 of the implicit gesture learning system 100 can also be coupled to a communication module 114. The communication module 114 can be used to interface the implicit gesture learning system 100 with a cellular phone or other communication device. The communication module 114 can also be used to communicate with other external devices or networks. In one embodiment, the communication module 114 can include a Bluetooth® communication system for communicating with cellular phones or other portable electronic devices. The communication module 114 can also communicate with external cellular networks such as those operating using LTE, 4G, 3G, or other cellular communication protocols as are known in the art. The communication module 114 can also be equipped to operate using a Wi-Fi connection such as IEEE 802.11-type networks. Additionally, the communication module 114 can also be capable of receiving information from Global Positioning Satellites ("GPS"). Positional information can be received via the GPS by the communication module 114.

The processor 102 of the implicit gesture learning system 100 can also be coupled directly to the vehicle via a vehicle interface module 116. The vehicle interface module 116 can allow the implicit gesture learning system 100 to have access to vehicle information such as speed, rpm, engine temp, etc. Furthermore, the vehicle interface module 116 can allow for communication between all of the vehicle systems and the implicit gesture learning system 100. Non-limiting examples include communication with the infotainment system, the climate control system, power windows, power locks, internal lighting, or other system as is known in the art. Additionally, via the vehicle interface module 116, the implicit gesture learning system 100 may be able control certain systems of the vehicle such as infotainment, climate control and other systems. In some embodiments, the implicit gesture learning system 100 can be limited to only controlling those vehicle systems that could not affect the safety of operating the vehicle, but may be extended to safety features as well. The vehicle interface module 116 can communicate with the vehicle via an industry standard communication protocol such as CAN or CAN Open. Alternatively, the vehicle interface module 116 can communicate with the vehicle via any communication protocol as is known in the art. Additionally, the vehicle control system 116 can detect the presence of a vehicle output 118. The vehicle output 118 may include the outputs of one or more vehicle systems that may indicate a current status of the system, as well as an indication of whether any user interfaces of the vehicle systems have been activated. For example, in the case of a power window, the vehicle outputs 118 may indicate a current status of the power window (e.g., 50%, fully closed, currently opening, currently closing) and an indication of whether the power window button is current activated (and in what direction). Similarly, in the case of a reading light, the system output may indicate a current status of the light (e.g., on, off, 50% brightness) and an indication of whether the reading light button has been pressed. Accordingly, it is to be understood that a vehicle output 118 can include any signal that indicates the activation of a vehicle system, interface, or device.

The processor 102 of the implicit gesture learning system 100 can also be coupled to a memory device 120. The memory device 120 can store information related to features 122, antecedent knowledge 124, precedential knowledge 126, and buffer data 128, as well as information related to ethos and standards 130. This data will be discussed in more detail below.

Figure 2:
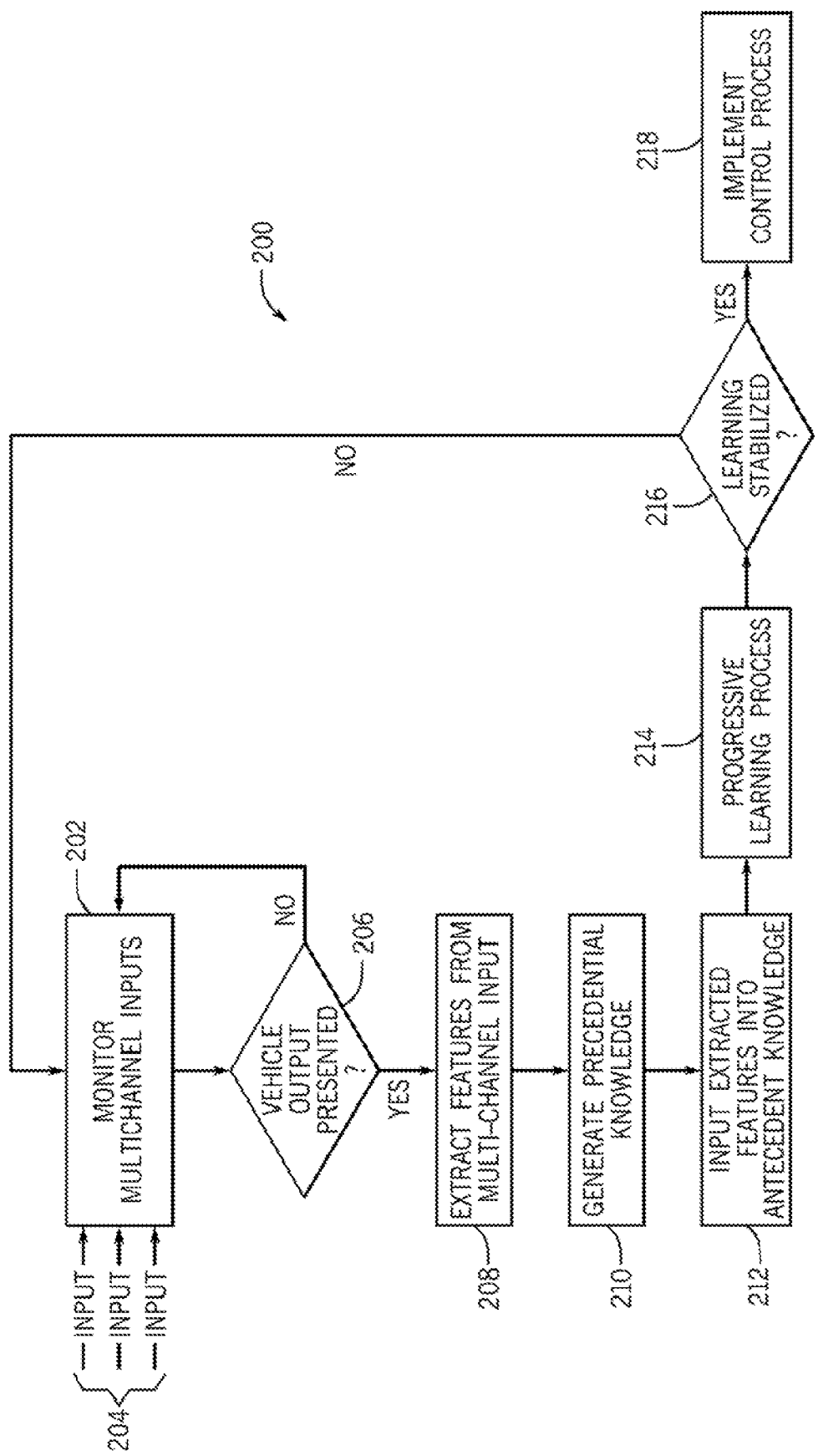
FIG. 2 is a flowchart depicting an embodiment of an implicit gesture learning process.

Turning now to FIG. 2, an embodiment of an implicit gesture learning process 200 of an implicit gesture learning system 100 can be seen. In one embodiment, the implicit gesture learning process 200 is always active. By presenting an implicit gesture learning process 200 that is preferably constantly active, the implicit gesture learning system 100 is adapted to better predict a user's behavior. In one embodiment, the implicit gesture learning process 200 is preferably executed by and can allow the implicit gesture learning system 100 to detect and interpret implicit gestures. Implicit gestures can be defined by their minimalist cognitive load required to perform, or otherwise as gestures performed by a user in response to one or more external stimuli, and not in response to a predefined training process or required particular motion or gesture for indicating an input to a system. In one embodiment, implicit gestures can be determined based on repeated actions of a user when performing certain operations. In other embodiments, routine user habits can also be interpreted as implicit gestures. In one embodiment, an implicit gesture may demonstrate the following features:

1) A lower cognitive load than deliberate and explicit gesture recognition, in which action and reaction are clearly defined and delineated by system inputs/outputs 2) The lower cognitive load is lower in every aspect, intrinsic, germane, and extraneous components of the load 3) A trigger point defined by a system level consequence, preceded by a set of extracted visual, audio, and other features extracted by an intelligent feature extractor 4) A habitual act or behavior that is extracted through a feature extractor tool 5) A low cognitive load target that is associated naturally with habitual user behavior 6) An extracted knowledge of that habitual behavior through an intelligent feature extractor 7) An extracted outcome associated with that behavior through a behavior monitoring system and the association of that system's outcomes 8) A prediction step associated with that behavior.

In one embodiment, ethos-based rules can be put into place to ensure that such a system does not encourage or reinforce negative behavior. The system may also be configured to find ways with which to learn from its own mistakes and be self-healing. One example of the latter can occur when the system is "corrected" by turning off an action the system has completed or initiated, and the user turning on an alternate action. In vehicular environments, safety and concentration is of paramount importance. One important aspect of this system is its ability to identify negative behavior and discourage it.

At process block 202 the implicit gesture learning process 200 can constantly monitor a plurality of inputs 204. The plurality of inputs 204 can be provided from the multiple sensor devices of the implicit gesture learning system 100. The plurality of inputs 204 can also be provided from the communication module 114 or other modules. The vehicle interface module 116 can also provide a plurality of inputs 204. Non-limiting examples of possible inputs 204 can be, monitoring a user's torso postures through the visual sensors 104; monitoring and/or tracking a user's hands through the visual sensors 104; eye detection of multiple users through the visual sensors 104; voice and/or speech monitoring at all times through the audio sensors 106; identification of contact zones between users and the cockpit of the vehicle through the visual sensors 104 and/or the supplementary sensors 112; or, identification of objects external to the vehicle that are in contact with the vehicle environment through the visual sensors 104, telemetry sensors 108 or environmental sensors 110. Additionally, other non-limiting examples of inputs can be gathered through integration of other subsystems in the vehicle environment, including, but not limited to, smart-phones, tablets, personal computers or other personal electronic devices via the communication module 114. Environmental information can also be monitored via other environmental sensors 110. Available environmental information can include location, weather, traffic conditions or other information, external or internal to the cockpit, that can be presented to the implicit gesture learning system 100 via the telemetry sensors 108. Environmental information can also be gathered from the environmental sensors 110. Other environmental information can also be gathered through external systems such as Radio Data Systems (RDS) or Global Positioning Systems (GPS) via the communication module 114. A further example of an input can be a driver of a vehicle exhibiting signs of stress during tense driving conditions detected by the supplementary sensors 112 such as biometric or optical sensors.

In certain embodiments, the implicit gesture learning process 200 can divide the plurality of inputs 204 into discrete categories. In one embodiment, the implicit gesture learning process 200 can categorize the plurality of inputs 204 based on the type of sensor used. In another embodiment, the implicit gesture learning process 200 can categorize the inputs 204 based on the priority associated with the particular input 204. Prioritization of the plurality of inputs 204 can be learned in a similar manner to the learning of implicit gestures. One example learning process is through the use of a deep belief network, comprised of generalist and specialist subnets.

Continuing with FIG. 2, the implicit gesture learning process 200 can constantly monitor the plurality of inputs 204 at process block 202. Additionally, at process block 206 the implicit gesture learning system 100 can determine if a vehicle output 118 has been triggered. If a vehicle output 118 has not been triggered, the system will continue to monitor the plurality of inputs 202 until a vehicle output 118 is triggered.

Vehicle outputs 118 can be comprised of a variety of possible outputs and generally represent the activation of a feature of an in-vehicle system. Non-limiting examples of possible vehicle outputs 118 can be the activation of a navigation action; a button press resulting in a routine action for the vehicle (i.e. door locks, window actuation, etc.); or, any other system output that can be discerned as a vehicle output 118 by the occupants of the vehicle. Other possible non-limiting examples of vehicle outputs 118 may be generated or caused by the actions of the occupants within the vehicle. An example of a possible action by the occupants that could generate one or more vehicle outputs 118 may involve the occupant responding to external stimuli such as an occupant shielding their eyes from direct sunlight by lowering a visor. In that case, the occupant's movements would be detected by a sensor, such as visual sensor 104, in the vehicle. The visual sensor 104 would then analyze the detected movement and generate a corresponding output, which corresponds to the vehicle output 118. In this example, the vehicle output 118 generated by the sensor may indicate that an occupant has moved his or her arm and that a visor has been lowered. In order to process particular actions of an occupant of the vehicle into vehicle outputs 118, the implicit gesture learning system 100 may be pre-programmed with a number of gestures that constitute or correspond to particular vehicle outputs 118, such as a visor having been lowered, a rear view mirror having been adjusted, etc. In other embodiments, the gestures that can result in vehicle outputs 118 may instead be learned over time by the implicit gesture learning process 200 and preempted by the implicit gesture learning system 100. It should be known that the above vehicle outputs 118 can also be system inputs 104 into the implicit gesture learning system 100, such as a user actuating a button to lower or raise a window.

In a further embodiment, subsets of the vehicle outputs 118 can also be monitored. Non limiting examples of subsets of the vehicle outputs 118 can include voltage levels, analog measurements, intermediate values or any other value associated with a given vehicle output 118. In one embodiment, any of the plurality of inputs 204 that can be determined to be relevant to the problem of associating a given set of vehicle outputs 118 with a given set of multiple inputs 204 can be extracted.

Turning now to process block 208, once a vehicle output 118 has been presented, the implicit gesture learning process 200 can attempt to extract features 122 from the plurality of inputs 204 associated with the presented vehicle output 118. In one embodiment, features 122 can be extracted from multiple inputs 204 that are associated with a vehicle output 118. As described below, the features 122 may be extracted from inputs 204 that were received in some time period (e.g., a number of seconds) before and/or after the vehicle output 118 was presented at step 206. Alternatively, the features 122 may be extracted from inputs 204 that accumulated over time. Accordingly, the extracted features 122 may have occurred before or after the existence of the vehicle output 118. The extracted features 122 may constitute any values found within input 204 that fall outside of noise levels normally associated with the input 204. Accordingly, in the case of where input 204 involves data describing a movement of an occupant of the vehicle, a feature may include a distinctive motion of the occupant that falls outside of the steady-state movements of the occupant. Features 122 can also be extracted using a deep belief network comprised of a deep generalist network, a deep monitoring network, and a deep specialist network.

Figure 3:
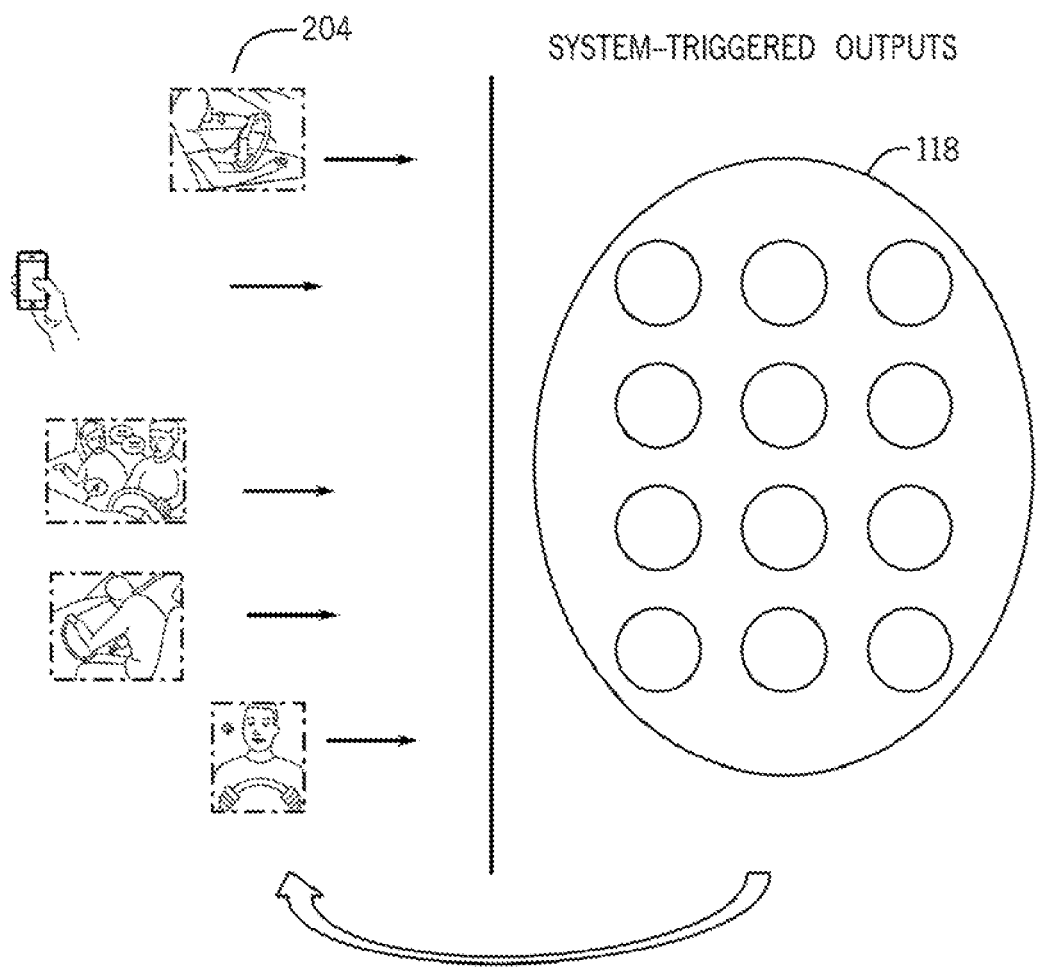
FIG. 3 depicts an example of the implicit gesture learning process of FIG. 2.

FIG. 3 illustrates a basic example of the implicit gesture learning process 200 of the implicit gesture learning system 100. The plurality of inputs 204 (e.g., comprising many different input channels) are presented to the implicit gesture learning system 100. Once vehicle outputs 118 are triggered and presented to the implicit gesture learning system 100, the implicit gesture learning process 200 can review the plurality of inputs 204 associated with the vehicle outputs 118 and extract features 122 based on the plurality of inputs 204. The extracted features 122 can then be stored in the memory device 120 of the implicit gesture learning system 100. In one embodiment, the extracted features 122 can include the plurality of inputs 204 that were presented within a predetermined time of the vehicle output 118 being presented. The predetermined time can be fixed during initial production of the implicit gesture learning system 100. Alternatively, the implicit gesture learning system 100 can vary the predetermined time in order to broaden or narrow the plurality of inputs 204 that can be associated with a presented vehicle output 118 based on the type of input 204 being monitored.

Figure 4:
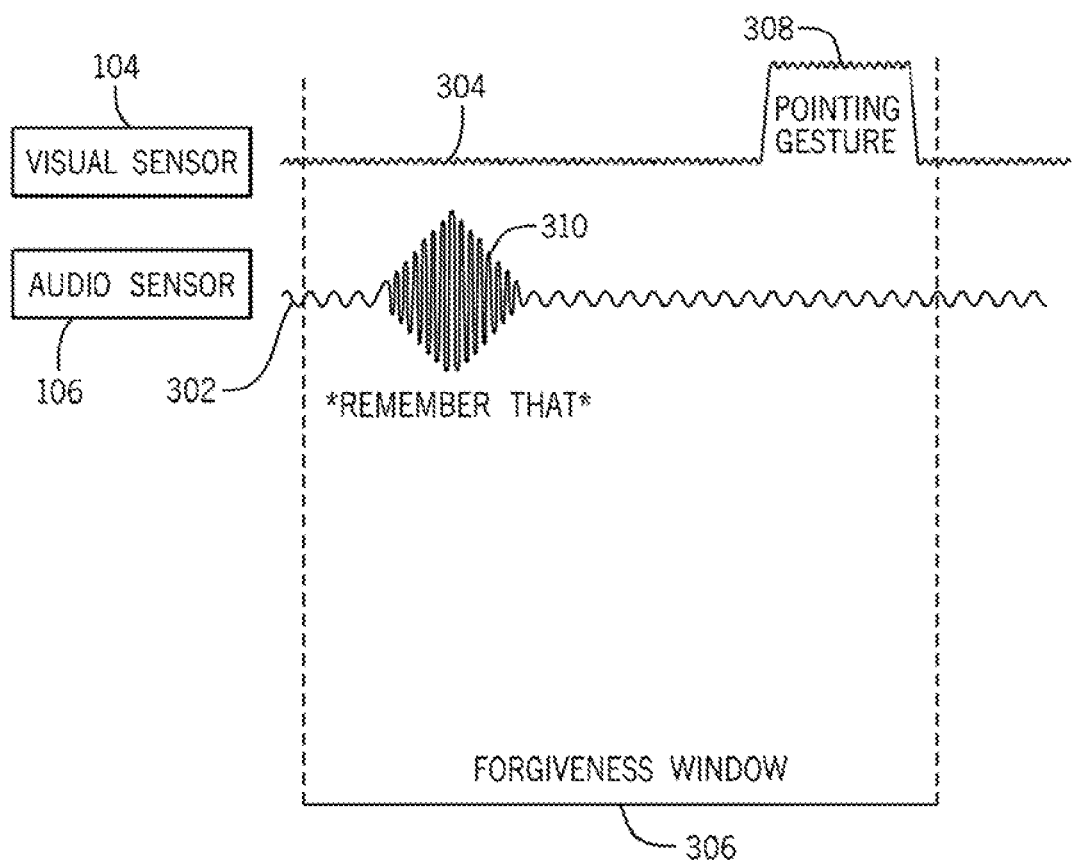
FIG. 4 is an illustration showing a feature extraction process.

Turning to FIG. 4, a non-limiting example of the feature extraction process 208 can be seen. In this example, a visual sensor 104 and an audio sensor 106 are being monitored by the implicit gesture learning system 100. The audio sensor 106 can be in an always-on condition. However, as conversations can be common inside a vehicle, the implicit gesture learning system 100 may not perform any action associated with an audio input signal 302 presented by the audio sensor 106 until a secondary input, such as a visual input signal 304 is detected by the visual sensor 104 causing a vehicle output 118 to occur. In some examples, the implicit gesture learning system 100 may not perform any action associated with an audio input signal 302 presented by the audio sensor 106 until a secondary input, such as a visual input signal 304 is detected, after having learned from previous examples that the audio input signal 302 is not indicative of a desired vehicle output 118. In one embodiment, the implicit gesture learning system 100 can store data from the plurality of inputs 204 in a buffer 128. The buffer can be in the form of a forgiveness time window 306. In one embodiment, the forgiveness time window 306 can have duration of about one second to about two seconds. In alternative embodiments, the forgiveness time window 306 can have a duration that is determined based on the type of input 204 being monitored. The forgiveness time window 306 can allow the implicit gesture learning system 100 to evaluate the plurality of inputs 204 that immediately precede a vehicle output 118 being detected.

In one example, the vehicle output 118 can be a pointing gesture 308 captured by the visual sensor 104. Once the vehicle output 118 has been detected by the implicit gesture learning system 100, the implicit gesture learning system 100 can evaluate the plurality of inputs 204 that were presented to the implicit gesture learning system 100 and fall within a forgiveness time window 306 of that implicit gesture learning system 100. In the present example an audio voice command 310 of "Remember That" falls within the forgiveness time window 306 and the implicit gesture learning process 200 can extract the audio voice command 310 "Remember That" as a feature 122. Subsequently, based on other presented inputs 204, the implicit gesture learning system 100 can determine what the user is pointing at (e.g., using positioning data from, for example, a GPS system, and vehicle attitude and/or orientation data captured from, for example, telemetry sensors), and subsequently store related information in the memory device 120.

Returning to FIG. 2, once the implicit gesture learning process 200 has extracted the features 122 associated with a vehicle output 118 at process block 208, the implicit gesture learning process 200 can then proceed to process block 210. At process block 210, the implicit gesture learning process 200 can generate precedential knowledge 126. In one embodiment, precedent knowledge 126 can be knowledge generated in a window of forgiveness that immediately precedes a detected vehicle output 118. This precedential knowledge 126 can be used to associate extracted features 122 with a vehicle output 118. In one embodiment, the extracted feature 122 relating to precedential knowledge 126 can be an explicit gesture such as a voice command or hand signal, or a combination of the same. In another embodiment, the extracted feature 122 can be in the form of an implicit gesture. An implicit gesture can be defined as natural behaviors of a vehicle occupant that are learned by an unsupervised system which are triggered by a series of repeatable system outputs, harnessing antecedent multichannel input features, and defined by natural and intuitive human motion. As will be seen in more detail below, precedential knowledge 126 based on implicit gestures can be used by the implicit gesture learning system 100 to anticipate a desired vehicle output 118 based on monitored inputs 204. In one embodiment, the implicit gesture learning system 100 can generate precedential knowledge 126 by comparing extracted features 122 against antecedent knowledge 124 stored in the memory device 120.

At process block 212, the implicit gesture learning process 200 can compare the current extracted features 122 against antecedent knowledge 124 contained in the memory device 120. In one embodiment, the implicit gesture learning process 200 can input current extracted features 122 into the antecedent knowledge 124. The antecedent knowledge 124 can be a plurality of previously extracted and stored features 122 associated with a given vehicle output 118. In another embodiment, the antecedent knowledge 124 can be knowledge stored from deep learning through a generalist network, a specialist network, and a monitor network. The comparison may involve determining whether the presently-identified set of features has been associated with particular vehicle outputs 118 in the past.

Figure 5:
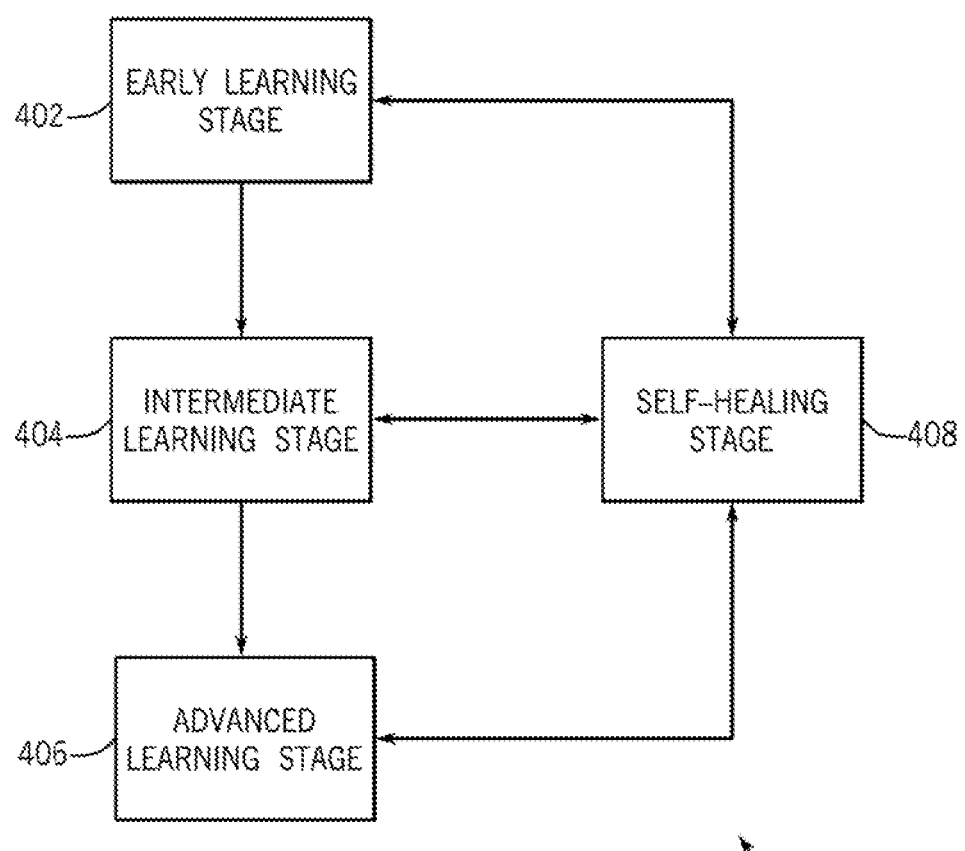
FIG. 5 is a flowchart showing a progressive learning process.

At process block 214, the precedential knowledge 126 can be input into a progressive learning process 400 which would eventually constitute antecedent knowledge 124. FIG. 5 shows an embodiment of the progressive learning process 400 in the form of a phased learning sequence. The progressive learning process 400 can have three—or in other embodiments, any number of—stages of learning; specifically, an early learning stage 402, an intermediate learning stage 404 and an advanced learning stage 406. The early learning stage can extract broad features 122 from the plurality of inputs 204 such as features 122 relating to body posture, eye movements, object tracking, etc. as non-limiting examples associated with the generated precedential knowledge 126. The intermediate learning stage 404 can extract a subset of features 122 from the features 122 extracted during the early learning stage 402. Finally, the advanced learning stage 406 can further reduce the subset of features 122 extracted in the intermediate learning stage 404 and early learning stage 402. By reducing the features 122 associated with a desired vehicle output 118, the implicit gesture learning system 100 can react more quickly to a user's behavior. Additionally, in one embodiment, a self-healing stage 408 can determine if certain features 122 have been incorrectly extracted and associated with a desired vehicle output 118. The self-healing stage 408 can alter the extracted features 122 associated with a desired vehicle output 118. In certain embodiments, the self-healing stage 408 can cause the progressive learning process 400 to return to the intermediate learning stage 404 or early learning stage 402 as necessary. In one embodiment, the implicit gesture learning system 100 can determine if a certain feature has been incorrectly extracted and associated with a desired vehicle output 118 by determining that a user has turned off or corrected the vehicle output 118 generated by the implicit gesture learning system 100. To illustrate, Table 1, below, illustrates the different learning stages of an implicit gesture learning system 100 configured to detect when a user is attempting to read within the vehicle and then automatically turn on an overhead reading light.

Self-healing can also be accomplished by a subsystem of a vehicle, house, or any ecosystem of subsystems connected in the Internet of Things. For instance, if a related subsystem is negatively impacted by the implicit gesture learning system's response, it may choose to override such a response, or provide feedback to main deep learning subsystem. In this case, self-healing is done in a completely non-human fashion, i.e. no human initiated response or input is in the decision loop.

TABLE 1

| Learning Features | Features Extracted | Manifestation | Required Trigger Event |
|---|---|---|---|
| Early Learning | Features relating to body posture, eye tracking, object tracking, orientation, and other features. | User reaches up/out to turn the light on (and) User looks up (and) User opens a book (and) User drops their head | Turning Light on |
| Intermediate Learning | More features from the ones listed above, and deeper, more specialized features. | Two of the three: User reaches up/out, looks up, opens a book. | None |
| Advanced Learning | Unknown. Features of features extracted by the system feature learner. Reduced set. | Any of the three. | None |
| Advanced Learning/ Self-Healing | A bigger set of features | Any combination of the three. | Turning light off, setting another system output |

At process block 216, the implicit gesture learning process 200 can evaluate whether the learning has stabilized. The implicit gesture learning process 200 can determine that the learning has stabilized by evaluating a confidence level associated with the generated precedential knowledge 126. The implicit gesture learning process 200 can evaluate the stage of progressive learning process 400 implemented for a given set of features 122 to determine a confidence level. Alternatively, the implicit gesture learning process 200 can determine the history of the self-healing stage 408 being implemented in regards to a particular set of precedential knowledge 126 to generate a confidence level. In one embodiment, the implicit gesture learning process 200 can determine the history of the self-healing stage 408 using unsupervised learning in conjunction with a deep learning process. Unsupervised learning combined with a deep learning process allows the implicit gesture learning process 200 to move from state to state without requiring pre-defined criteria. The implicit gesture learning process 200, at process block 216, determining that the learning has been stabilized, can implement an implicit gesture control process 450 at process block 218.

Figure 6:
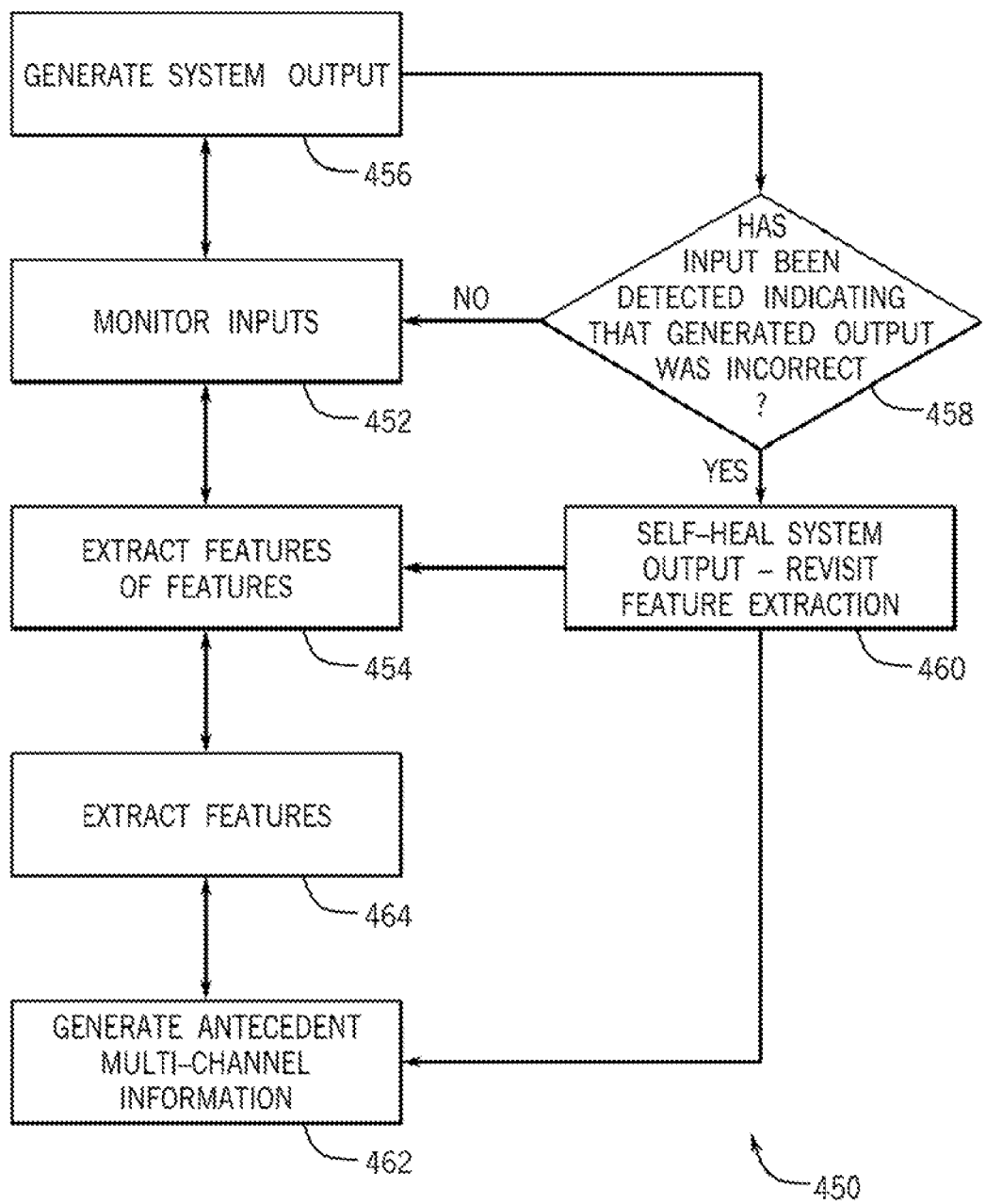
FIG. 6 is a flowchart illustrating a gesture control process.

Turning to FIG. 6, an embodiment of an implicit gesture control process 450 can be seen. The implicit gesture control process 450 at process block 452 continues to monitor the plurality of inputs 204. At process block 454, the implicit gesture control process 450 can continue to extract features 122 associated with the plurality of inputs 122 when a vehicle output 118 is generated. The vehicle output 118 can be generated by a user at process block 456. However, where sufficient precedent knowledge 126 is available and the implicit gesture learning process 200 has stabilized, the implicit gesture control process 450 can generate a vehicle output 118 based on the monitored plurality of inputs 204 without waiting for a detected vehicle output 118. In other words, the implicit gesture control process 450 uses antecedent or precedential knowledge created during the implicit gesture learning process 200, described above, to generate system outputs based upon the existence of one or more detected features.

Accordingly, the process illustrated in FIG. 2 can be utilized to identify implicit gestures is then defined as learned system-level architectural knowledge propagation associations between occupants and the overall system-level integration of in-vehicle cockpit analytics. Implicit gestures, once identified can be viewed as discriminative associations, in which associations and patterns are learned through repetitive behavior by a user. Outcomes can then be predicted from these unsupervised learned experiences, such that the repetitive behavior, involving multiple input channels triggers output behaviors. Generative associations can then be extracted without explicitly waiting for a system output to be triggered. This process of preempting a system output (e.g., the implicit gesture control process 450 illustrated in FIG. 6) can then be used to reduce the overall amount of time that completing a task requires, and to improve its responsiveness, ultimately resulting in a reduced cognitive load.

Returning to FIG. 6, additionally, at process block 456, the implicit gesture control process 450 can continue to monitor the vehicle outputs 118, and, if the implicit gesture control system 100 detects an input 204 indicating that the vehicle output 118 generated by the implicit gesture learning system 450 is incorrect at process block 458, the implicit gesture control process 450 can initiate a self-healing function 460. The self-healing function 460 can operate in the same manner as the self-healing stage 408 of the progressive learning process 400.

In one embodiment, the self-healing function 460 is activated when a user deactivates a vehicle output 118 that was initiated by the implicit gesture control process 450. The self-healing function 460 can have the implicit gesture learning process 200 generate multi-channel antecedent knowledge 124 at process block 462. The antecedent knowledge 124 can be used by the implicit gesture learning process 200 at process block 464 to extract additional features 122. These additional features 122 can subsequently be further extracted at process block 454. The self-healing function 460 can also directly interface with process block 454 to alter the features 122 extracted at process block 454. To illustrate, if a passenger is reaching up towards the reading light, the system may believe that, based upon prior, similar actions, the passenger is attempting to turn on the reading light. Based upon that belief, the system may then turn on the reading light for the passenger. If, however, that was not the desired system response (e.g., the passenger was instead reaching up to use the sun visor), the passenger will turn off the light, negating the system output that was just generated by the gesture detection system. The passenger's turning-off of the reading light represents a self-healing action. The self-healing action is then learned by the system and if the decision-making is confused enough, the system will stop trying to learn that particular system output.

Figure 10:
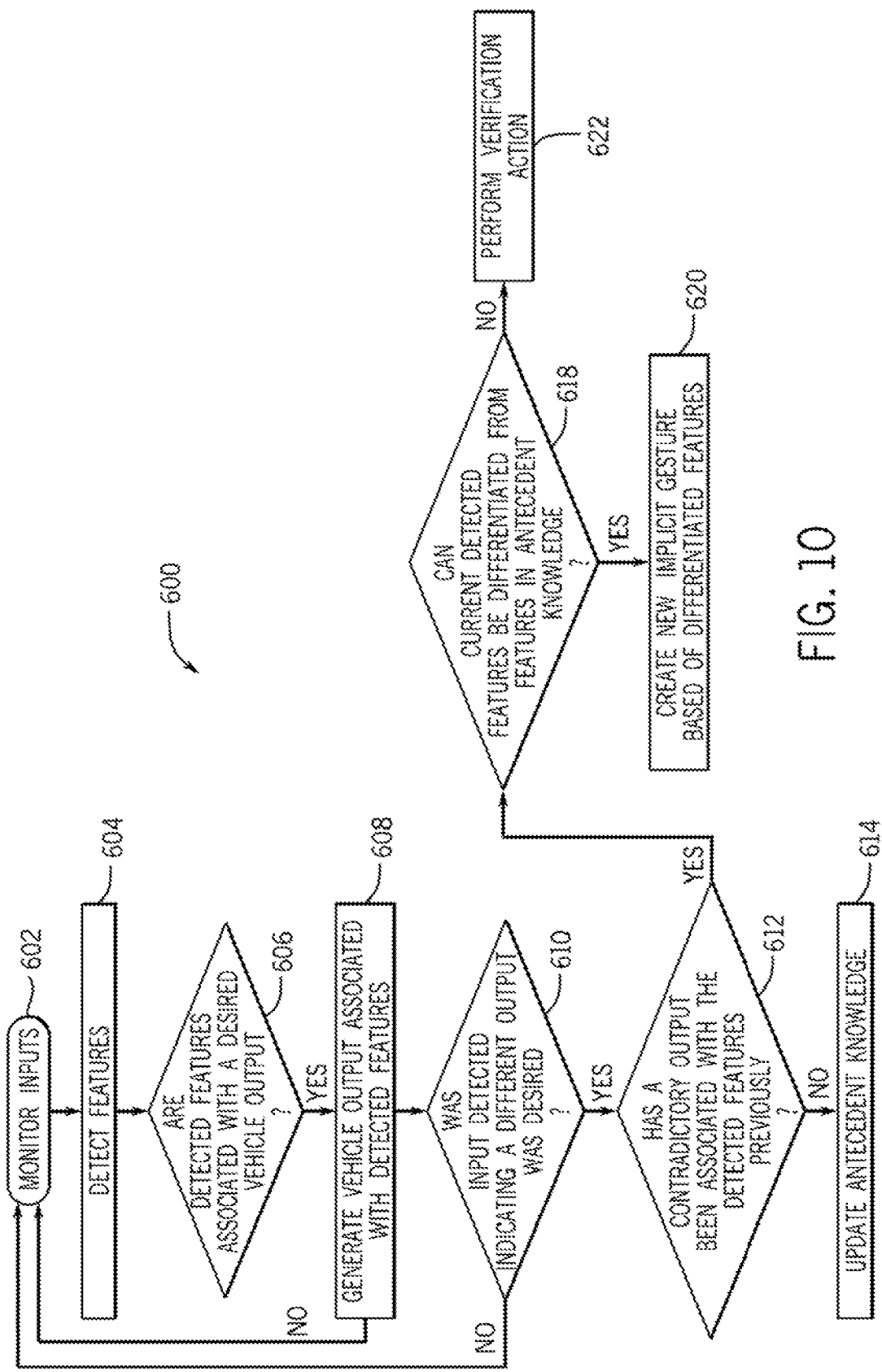
FIG. 10 is a block diagram depicting a self-healing process for an implicit gesture learning system.

Turning to FIG. 10, a non-limiting example of a self-healing process 600 can be seen. At process step 602 the implicit gesture learning system 100 can monitor the plurality of inputs 204. At process step 604 the implicit gesture learning system 100 can detect a set of features 122 via the plurality of inputs 204. At process step 606 the implicit gesture learning system 100 can compare the detected features 122 against the antecedent knowledge 124 to determine if a desired vehicle output 118 is associated with the detected features 122. Turning now to process step 608, the implicit gesture learning system 100 can generate a vehicle output 118 associated with the detected features 122. In this regard, process steps 602, 604, 606 and 608 correspond to an operation of an implicit gesture control process.

At process step 610, the implicit gesture learning system 100 can further monitor the plurality of inputs 204 to determine if a subsequent input 204 is detected, that indicates that a contradictory or different vehicle output 118 was instead desired by a user. In one embodiment, a contradictory vehicle output 118 can be the user returning the generated vehicle output 118 to a condition prior to the vehicle output 118 being generated by the implicit gesture learning system 100—that is, the user has effectively cancelled the vehicle output 118 generated by the implicit gesture learning system 100. Additionally and optionally, a user may then, in addition to canceling the vehicle output generated in step 608, select a different desired vehicle output 118. An example of the user indicating a contradictory vehicle output 118 may involve the implicit gesture learning system 100 generating the vehicle output 118 of lowering a driver's side window when the user reaches towards the window controls. This action may be based upon antecedent knowledge 124 that indicates that when the driver reaches towards the window controls, the driver has, historically, activated the window controls to change the state of the driver side window (e.g., lowering the window from a raised position, or raising the window from a lowered position). In this example, however, once the driver's side window has been lowered, the user actually actuates the window controls to raise the driver's side window. This action is, therefore, contradictory to the original vehicle output 118 of lowering the window and triggers a self-healing action, as described below. The user may then choose to not initiate any other outputs, or the user may actuate the switch to lower a passenger window, indicating a contradictory output was desired.

A contradictory vehicle output 118 can also be determined where a user changes the scale of the vehicle output 118 generated at process step 608. A non-limiting example may be a user increasing the volume of an audio system beyond the increase presented by the implicit gesture learning system 100. Alternatively, a user may reduce the volume from the level increased by the implicit gesture learning system 100, thereby indicating a contradictory vehicle output 118.

In a further embodiment, a contradictory vehicle output 118 may be determined based on the amount of time that had elapsed between the time that the implicit gesture learning system 100 generated the vehicle output 118 and the time when the contradictory vehicle output 118 was detected. As an example, where the user reaches up towards a light, the implicit gesture learning system 100 may turn on the light as an output. Subsequently, the user may turn off the light. The implicit gesture learning system 100 can then evaluate the time between the light being turned on and the user turning the light off. Where the time is less than a pre-determined time period, the implicit gesture learning system 100 may interpret the user turning off the light as a contradictory vehicle output 118 requiring self-healing. In contrast, when the time is greater than a pre-determined time period, the implicit gesture learning system 100 may interpret the user turning off the light as a separate action and evaluate the features 112 associated with the user turning off the light as a new implicit gesture. The pre-determined time period used by the implicit gesture learning system 100 can be a parameter set within the implicit gesture learning system 100. In one embodiment, the pre-determined time period can be determined by the implicit gesture learning process 100. As such, the pre-determined time period can be evaluated as another feature 112 to be evaluated. By evaluating the pre-determined time period as a feature 112, the implicit gesture control system 100 can apply different pre-determined time periods to different vehicle outputs 118.

Once the implicit gesture learning system 100 determines that a contradictory vehicle output 118 is desired, the implicit gesture learning system 100 can evaluate whether a contradictory vehicle output 118 has been previously indicated for the detected features 112 at process block 612. This may indicate, for example, that the user had to generate the contradictory vehicle output a number of times in the past. If the implicit gesture learning system 100 determines that the contradictory vehicle output 118 has not been previously indicated, the implicit gesture learning system 100 can store the contradictory vehicle output 118 in the antecedent knowledge or otherwise update the antecedent knowledge 124 in step 614 based upon the contradictory vehicle output 118 for future evaluation and take no further action.

In one embodiment, the contradictory vehicle output 118 is stored in the antecedent knowledge 124, and a deep learning process is implemented to perform a self-healing action on the antecedent knowledge 124. In a further embodiment, the deep learning process can use a Markovian process to determine if a self-healing action is needed, and, in some cases, to implement the self-healing. In alternative implementations, if the implicit gesture learning system 100 determines that the contradictory vehicle output 118 has been associated with the detected features 112 a number of times in the past (e.g., greater than a threshold number of times) the implicit gesture learning system 100 may take a self-healing action. In some embodiments, however, there is no threshold requirement before self-healing will occur. Instead, upon the first instance of detecting a contradictory vehicle output 118, self-healing, as described below, will be undertaken by the implicit gesture learning system 100. Furthermore, the implicit gesture learning system 100 can examine other information associated with the indicated contradictory vehicle output 118 to determine if self-healing action should be taken. Non-limiting examples of possible information that can be evaluated by the implicit gesture learning system 100 relating to a contradictory vehicle output 118 to determine whether self-healing should be undertaken can be the time of day the vehicle output 118 occurred; the number of occurrences of the contradictory vehicle output 118; or the percentage of time that the contradictory vehicle output 118 is detected. It should be known that the implicit gesture learning system 100 can evaluate any other information available to determine if self-healing action should be taken.

The self-healing process involves the implicit gesture learning system 100 incorporating the contradictory vehicle output 118 and features associated with that contradictory vehicle output 118 into the antecedent knowledge. By incorporating this information into the antecedent knowledge, when the same set of features is identified in the future (or the set of features, plus additional information, as described below), the implicit gesture learning system 100 may generate the contradictory or complementary vehicle output 118, which may more accurately reflect the intent of the user. In performing self-healing, the implicit gesture learning system 100, can utilize the features 112 that were originally associated with the generated vehicle output 118. In some cases, though, in addition to utilizing the features 112 that were extracted, the implicit gesture learning system 100 can also utilize additional inputs 204 that were received contemporaneously with the detected features 112, but may not have been identified as features at the time. In one embodiment, when performing self-healing, the implicit gesture learning system 100 can evaluate the plurality of inputs 204 that were received before and after the features 112 were detected, for example. The implicit gesture learning system 100 can evaluate the plurality of inputs 204 that occurred within a predetermined time window from the time the features 112 were detected. In one embodiment, the predetermined time period can be about 1 second to about 3 seconds.

The implicit gesture learning system 100, having evaluated the presented features 112 and, optionally, additional inputs 204, can then determine if additional features 112 can be extracted from the features 112 and inputs 204 to differentiate the current features 112 from the previously extracted features 112 at process block 618. For example, the current features 112 may differ from the features stored in the antecedent knowledge in association with the generated vehicle output 118 in some manner discernible by the implicit gesture learning system 100. If the implicit gesture learning system 100 can extract or otherwise identify differentiated features 112, the implicit gesture learning system 100 can generate a new implicit gesture based on the differentiating features 112 at process block 620. The new implicit gesture and associated features 112 can then be stored in the antecedent knowledge 124 for future use.

To illustrate, a user may reach towards the vehicle's console generating a set of features 112 that include features 112 associated with the user's arm and hand moving forwards within the vehicle to the console. Upon detecting that set of features 112, and inputting those features 112 into the deep learning system, the implicit gesture learning system 100 may determine that when the user performs that gesture, it results in the state of the vehicle's air conditioning system being changed. As such, the implicit gesture learning system 100 may change the air conditioning system's state. In this example, though, this is an incorrect vehicle output, since the user was moving in that direction for a different purpose altogether. In this example, the user wanted to adjust the volume of the vehicle's multimedia system. Once the user has adjusted the volume, the implicit gesture learning system 100 may detect that adjustment as a contradictory or complementary vehicle output resulting in initiation of the self-healing process. In this example, the implicit gesture learning system 100 may attempt to distinguish the features 112 that were initially identified. The implicit gesture learning system 100 can attempt to distinguish the features 112 by identifying one or more details of the present features 112 that are not found in the antecedent knowledge 124. This can be done in an unsupervised manner. The implicit gesture learning system 100 can also attempt to distinguish the features 112 by introducing inputs 204 associated with the feature 112 into a deep learning system that is capable of receiving such multichannel/multimodal inputs 204.

In this example, the user's fingers are positioned differently between changing the state of the air conditioning system, involving a precedential set of features that are extracted from the event, and encapsulating adjusting volume (involving even more features relevant to having, for instance, multiple outstretched fingers arranged to grasp a volume knob). With features being learned and differentiated between various events being solidified, the implicit gesture learning system 100 can enter the differentiated feature set (outstretched hand with fingers positioned to grasp a knob) into the antecedent knowledge and associate those features with a vehicle output involving an adjustment of audio volume.

In general, any attributes of the input data can be used to distinguish a set of features. In the case of arm gestures, finger configuration, arm and hand position and orientation, and the rate at which a gesture occurs can all be used as inputs 204 for extracting a differentiating feature set 112. In other cases, similar implicit gestures may be distinguished based upon one or more inputs 204 relating to environmental data. The same events, for example, may be distinguished based upon information such as the time of day, phone usage, a vehicle being stationary or not, etc.

If the implicit gesture learning system 100 cannot extract differentiating features 112 associated with the contradictory vehicle output 118, the implicit gesture learning system 100 can perform a verification action at process block 622. In one embodiment, the verification action can comprise the implicit gesture learning system 100 prompting the user to identify which output is desired based on a given set of features 112 making up a particular set of system inputs or to indicate that no action was made or intended. The implicit gesture learning process 100 can also perform a verification action by transmitting the features 112 associated with the contradictory vehicle output 118 to a server via the communication module 114 where it can be further evaluated either in isolation, or in combination with a set of features captured from a large number of vehicles.

In one embodiment, the implicit gesture learning system 100 can also contain system ethos and standards 130 to provide parameters and limits to the decision-making process of the system. The system ethos and standards can disallow the implicit gesture control process 450 from being triggered automatically every time a vehicle output 118 is triggered. This set of system-level ethos and standards can be put into the memory device 120 of the implicit gesture learning system 100 to ensure that the implicit gesture learning system 100 does not encourage or reinforce negative driving behavior. In one embodiment, negative driving behavior can be any activity which would distract the driver from operating the vehicle. In a further embodiment, certain ethos and standards 130 can be triggered based on the presence of adverse driving conditions. Non-limiting examples of adverse driving conditions can be bad weather, slippery conditions, or congested roadways. In one embodiment, the implicit gesture control process 450 may implement certain ethos and standards based on multiple inputs 204 related to the stress level of the driver.

In one embodiment, the gesture system ethos and standards may embody the following rules:
1) Multi-channel input is encouraged to ensure a rich repertoire of feature sets extracted from seemingly disparate resources.
2) A system with safety first in mind.
3) Allowing the driver to focus on driving.
4) Safety of occupant in the vehicle, including human and non-human passengers
5) Monitoring of vital signs for driver, passengers, and other occupants 6) Encouraging hands on the wheel.

7) Encouraging passenger interaction with the different information systems of the vehicle.

8) Encouraging eyes on the road by the driver.

9) Minimizing distraction by the driver.

10) Encouraging a better driving posture.

11) The system is self-healing and can learn from its mistakes through manifestations of user response.

12) If the system is still confused about given outputs, through repeated wrong results, then the system will decide to shut down further attempts until adequate differentiation is available.

Figure 7:
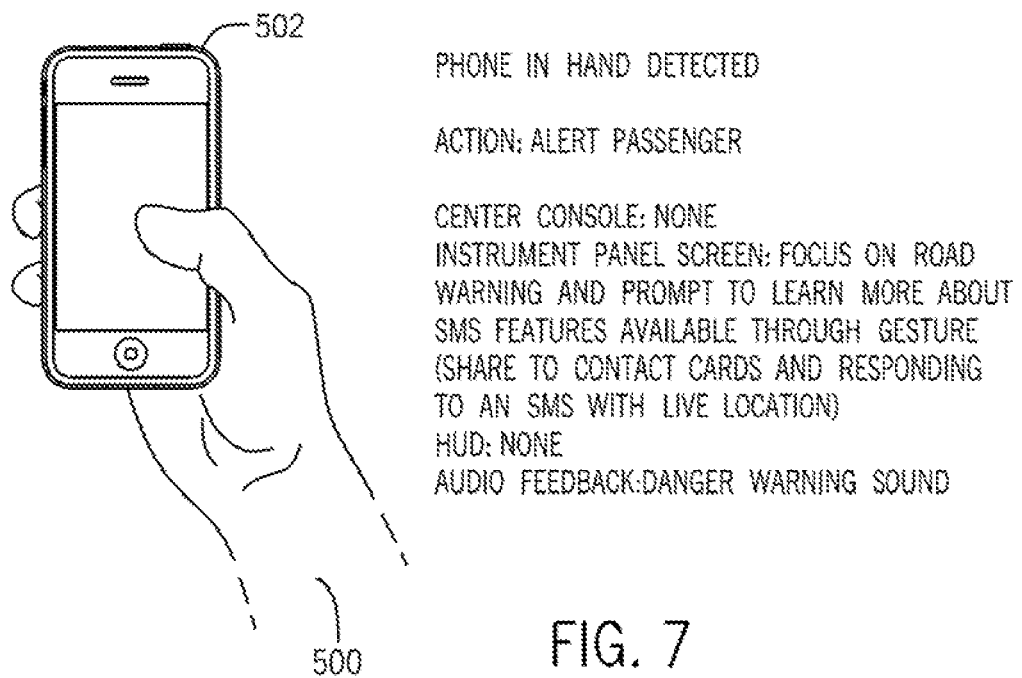
FIG. 7 depicts an example application of the present implicit gesture learning system.
Figure 8:
FIG. 8 depicts a message that may be depicted by the implicit gesture learning system.

In FIG. 7, a non-limiting example of an application of an implicit gesture learning system 100 in a vehicle can be seen. FIG. 7 illustrates the implicit gesture learning system 100 determining an SMS event on a drivers 500 cellular telephone 502. In one embodiment, the implicit gesture learning system 100 can monitor inputs 204 such as visual detection of the user reaching for the cellular phone 502 and visual detection of the driver's 500 eyes moving away from the road via the visual sensors 104. The implicit gesture learning system 100 can also monitor information provided by the user's cellular phone 502 indicating that an SMS message has been activated via the communication module 114. Features 122 of the presented inputs 204 can be extracted and compared to existing antecedent knowledge 124. In one embodiment, once the implicit gesture learning system 100 learns to detect the SMS event, the implicit gesture learning system 100 can perform certain actions such as display the SMS message on a system display screen that is within the driver's 500 field of view. Alternatively, FIG. 8 shows an embodiment wherein the implicit gesture learning system 100 can display a message 520 on the system display screen to reduce distraction and encourage the driver 500 to move their gaze back to the road.

In another example, a child may be left behind by the owner of a vehicle. After being left behind, the child wakes up, starts crying, and is in a state of distress. In such a set of circumstances, the present system may use relevant environmental sensors 110 to detect and extract various features associated with the baby's voice with the high-pitched tone, for instance, associated facial gestures, and an elevated heart rate, as well as ambient temperature. The system can also use its guiding ethics to drive its decision-making process. The result is a system output of an occupant in distress. Once a distress state has been identified, the system may choose to alert a human or even the owner of the vehicle. Note that the output is initiated by the system in this case, and not by a vehicle occupant. A system can and will initiate an output if one of its guiding ethical principles is violated. In some embodiments, vehicle occupants may have the chance to override some system outputs, depending on the level of safety and certainty that is associated with a particular system output.

In another example, the system may extract features that cause the system to turn on one or more overhead reading lights. In that case, after the system's feature extractor identifies an event associated with turning on a reading light and is done learning any set of features associated with such an event, a vehicle occupant may simply reach up to turn the reading light on, and the system will recognize those features (e.g., the features involving a passenger reaching upwards) and turn the light on before the passenger gets to the light. The passenger can also open a book and begin reading, preempting the system to turn the light on, or the passenger can look up and reach up, preempting the system, after significant feature learning to turn the light on.

Figure 9:
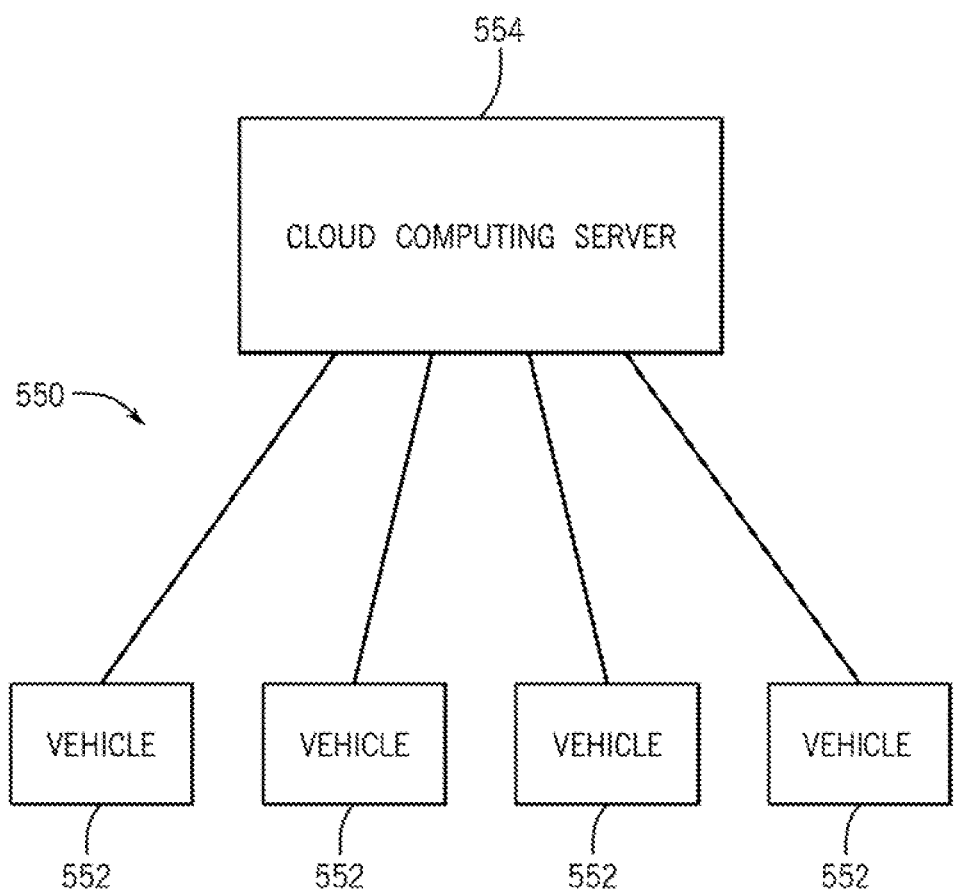
FIG. 9 is a block diagram depicting functional elements of a cloud-based implicit gesture learning system.

Turning now to FIG. 9, an example of cloud-based integration of implicit gesture learning system 550 can be seen. In one embodiment, a plurality of vehicles 552 can each contain an implicit gesture learning system 100. The plurality of vehicles 552 containing implicit gesture learning systems 100 can collectively aggregate hundreds of millions of hours of data from millions of drivers and passengers. This data can be transmitted by the plurality of vehicles to a cloud computing server 554 which can analyze the data to better streamline the individual implicit gesture learning systems 100. In one embodiment, the cloud computing server 554 can communicate to the plurality of vehicles 552 having an implicit gesture learning system 100 via the communication module 114. The data provided by the cloud computing server 554 can be in the form of features 122, antecedent knowledge 124, precedential knowledge 126, or ethos and standards 130. The data provided by the cloud computing server 554 can be stored in the memory device 120 of the implicit gesture learning system 100.

The present system, therefore, provides an advanced cockpit analytics system that can accumulate user data generated by any number of individual users over any number of hours of driving, including any number of interactions. Such data and its analytics component may be employed as a cornerstone for any of the inputs noted above. The herein described feature extractor can therefore effectively work with both precedent and antecedent information, allowing for newly presented information to update any existing feature knowledge. This continual updating of the feature knowledge allows for unsupervised or semi-supervised decision-making at a system level, and classification of previously unknown states at an output level.

The user data being so accumulated may be used in a number of different manners. First, the data may be provided to a centralized implicit gesture learning system to allow for a global adjustment to the implicit gesture recognition system. Thus, knowledge gleaned from any number of individual users may be employed to improve the overall robustness of the system. Next, the accumulated user data may be employed in a more local situation to allow for adjustments in the global implicit gesture recognition system related to one or more particular environmental factors associated with the particular use instance of the system. Thus, in a non-limiting example, it may be desirable to allow for all data accumulated in a particular automobile, home, etc. to be used to adjust one or more global parameters to allow for a more precise application to a particular implementation of the implicit gesture recognition system. Finally, the accumulated data may further be employed to provide adjustments at an individual level. In this non-limiting embodiment, data accumulated for one or more individual users may be further employed to adjust any global or implementation parameters to be further adjusted for each individual user of the system. In this manner, any particular user implementations that are not globally or locally applicable may still be taken into account when determining one or more implicit gestures. Such a hierarchical application of the implicit gesture learning system set forth in accordance with the various embodiments of the invention thus allows for the incorporation of a wide array of accumulated data into the global system, while maintaining implementation and user level detail for ideal implementations in each scenario. This can be seen in more detail below.

Figure 11:
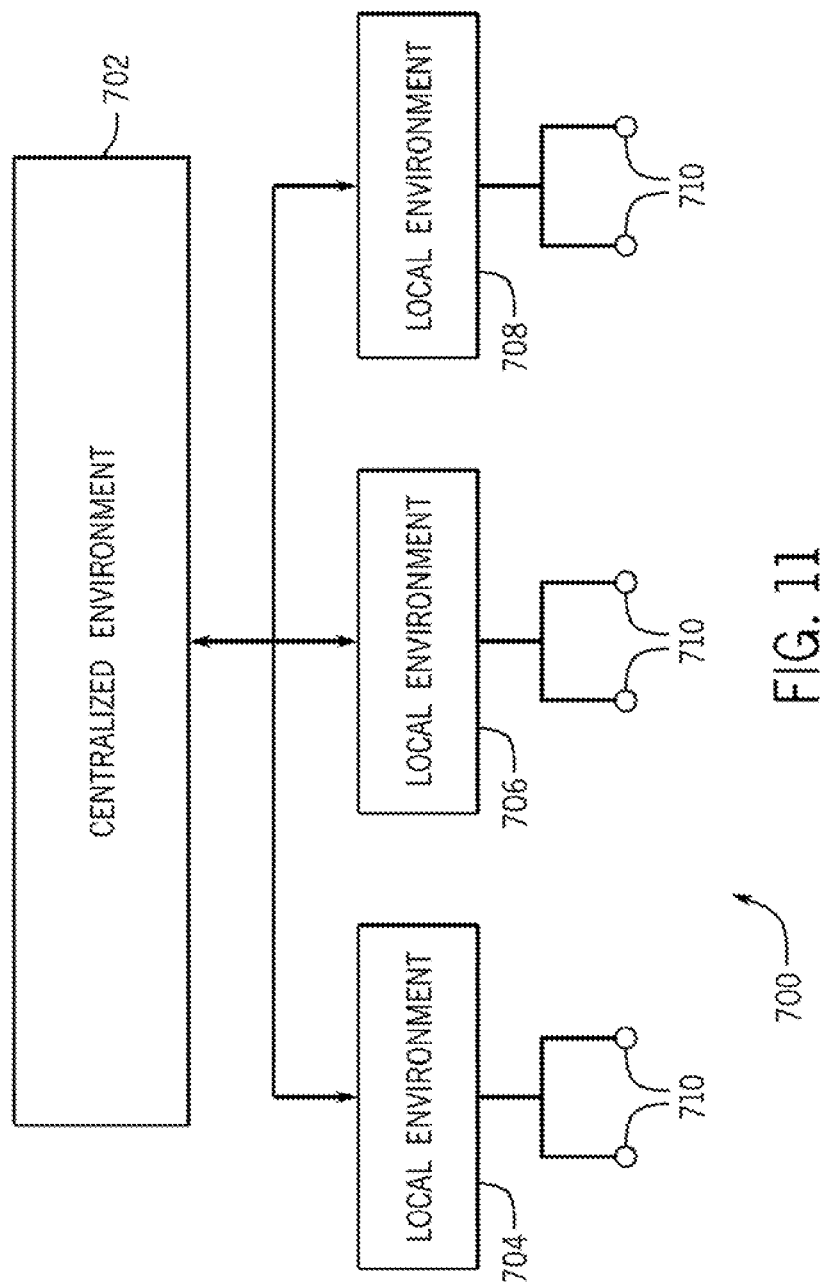
FIG. 11 is a block diagram depicting functional elements of a centralized implicit gesture learning system.

Turning now to FIG. 11, an example of a centralized implicit gesture learning system 700 can be seen. The centralized implicit gesture learning system can include a centralized environment 702. In one embodiment, the centralized environment 702 can be a cloud-based server. Alternatively, the centralized environment 702 can be a dedicated global server capable of communicating with multiple implicit gesture learning systems 100.

The centralized environment 702 can be in communication with one or more local environments 704, 706, 708. In one embodiment, local environments 704, 706, 708 can be individual implicit gesture learning systems 100. Alternatively, the local environments 704, 706, 708, can be groupings of similar implicit gesture learning systems 100. For example, local environments 704, 706, 708 can group implicit gesture learning systems by type. When grouped by type, local environment 704 can be categorized as vehicular, home, commercial, etc. Alternatively, implicit gesture learning systems 100 can be grouped by region, privacy settings, or any other grouping as applicable. While the present example shows three local environments 704, 706, 708, it should be known that the centralized implicit gesture learning system can comprise more or less than three local environments as needed.

The local environments 704, 706, 708 can be in communication with the centralized environment 702 via a form of electronic communication. In one embodiment, the local environments 704, 706, 708 can communicate with the centralized environment 702 using cellular data communication protocols, such as LTE, 4G, 3G or any cellular data communication as is known in the art. Further, the local environments 704, 706, 708 can communicate with the centralized environment 702 using Wi-Fi technology, such as IEEE 802.11x-type Wi-Fi protocols. In some instances the local environments 704, 706, 708 can communicate with the centralized environment 702 using a wired data connection such as an Ethernet connection. Alternative means of communication between the local environments 704, 706, 708 and the centralized environment 702 can be FM data communication, satellite communication, telephone communication, etc.

Each local environment 704, 706, 708 can include one or more individual users 710. An individual user 710 can be an occupant of a vehicle, an occupant of a home, or any other user of an implicit gesture learning system 100. The individual users 710 can directly interact with the implicit gesture learning systems 100 contained within the local environments 704, 706, 708.

Figure 12:
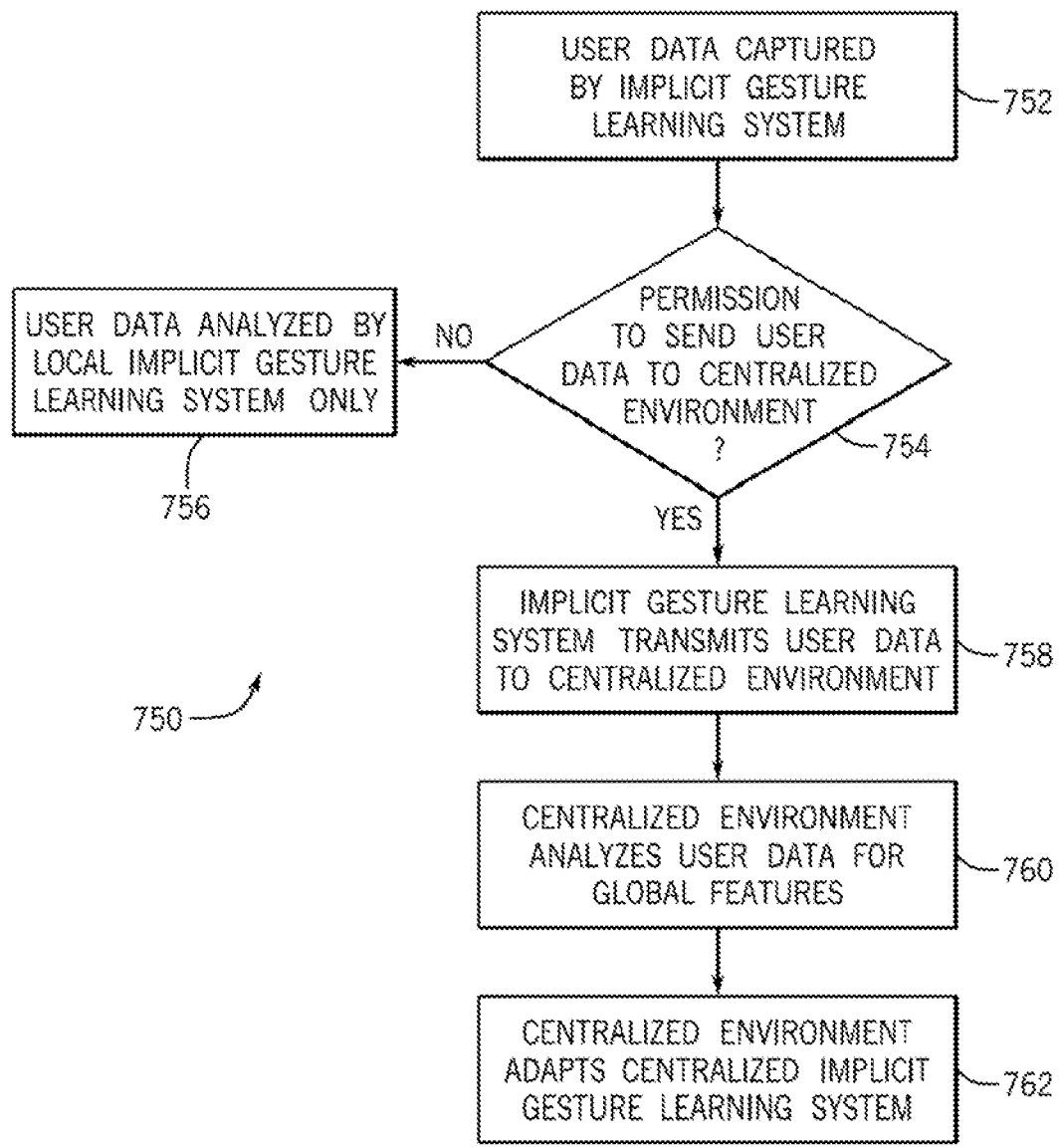
FIG. 12 is a block diagram depicting a global system update process.

Turning now to FIG. 12, a global system update process 750 can be seen. At process block 752, user data can be captured by the implicit gesture learning system 100. In one embodiment, user data can be antecedent knowledge 124 stored in the implicit gesture learning system 100. Alternatively, the user data can be precedential knowledge 126 stored in the implicit gesture learning system 100. Furthermore, the user data can be a combination of antecedent knowledge 124 and precedential knowledge 126 stored in the implicit gesture learning system 100. Additionally, other user data, such as features 122, ethos and standards 130 or any other data may also be captured by the implicit gesture learning system 100.

Turning now to process block 754, the global system update process 750 can determine if the implicit gesture learning system has permission to send the captured user data to the centralized environment 702. In one embodiment, an individual user 710 can establish permission levels of the implicit gesture learning system 100. The individual user 710 may be able to establish detailed permission levels based on particular aspects of the implicit gesture learning system 100. For example, an individual user 710 may disallow any user data to be shared with the centralized environment 702. The individual user may prohibit data to be shared with the centralized environment 702 to prevent private information from being shared with the centralized environment 702. Additionally, an individual user 710 can allow for only certain information to be sent to the centralized environment 702. For example, an individual user 710 may allow only information relating to hand or arm gestures to be transmitted to the centralized environment. Alternatively, an individual user 710 may not allow any information relating to voice identification or facial recognition to be transmitted to the centralized environment 702. In other instances, the individual user 710 may control permissions associated with other users of the implicit gesture learning system 100. For example, the individual user 710 can prevent the implicit gesture learning system from sending user data to the centralized environment 702 associated with any occupant in the rear passenger compartment of a vehicle.

The implicit gesture learning system 100, not having permission to send user data to the centralized environment 702 for further analysis, can use the captured user data to update the implicit gesture control process 200 at an individual implicit gesture control system 100 level, at process block 756.

The implicit gesture learning system 100, having permission to send user data at process block 754, can transmit the captured user data to the centralized environment 702 at process block 758. The transmission can be initiated at specific times to reduce traffic on the transmission network. In one embodiment, the implicit gesture learning system 100 can transmit user data to the centralized environment whenever new user data is captured. For example, where the implicit gesture learning process 200 inputs a new feature 122 into the antecedent knowledge 126, the implicit gesture control system 100 can transmit the new user data to the centralized environment 702. Alternatively, the implicit gesture control system 100 can transmit the new user data to the centralized environment 702 when the self-healing stage 408 alters previously extracted features 122.

The centralized environment 702, having received the user data transmitted from the implicit gesture learning system 100, can analyze the received user data to determine if the user data is applicable to the centralized implicit gesture learning system 700 at process block 760, i.e., the user data is applicable all implicit gesture learning systems 100 in the centralized implicit gesture learning system 702. In one embodiment, the centralized environment 702 can aggregate user data from multiple individual users 710 and apply an algorithm to determine which user data is applicable to the centralized implicit gesture learning system 700 as a whole. In one embodiment, this algorithm can utilize a statistical analysis to determine which user data is applicable to the centralized implicit gesture learning system 700. Alternatively, the algorithm can use a Markovian process to determine which user data is applicable to the centralized implicit gesture learning system 700. This ability to make global adjustments to multiple implicit gesture learning systems 100 based on user data gathered from any number of individual users may be employed to improve the overall robustness of multiple implicit gesture learning systems 100. The gathered user data can then be input to the overall implicit gesture learning system, contributing to further knowledge, and potentially modifying the system's overall outcomes over time.

The centralized environment 702, determining that the received user data is applicable to the centralized implicit gesture learning system 700, can globally update the centralized implicit gesture learning system 700 by transmitting an updated global parameter to all the implicit gesture control systems 100 connected to the centralized implicit gesture learning process 700. In one embodiment, the global parameters can modify existing antecedent knowledge 124 and/or precedential knowledge 126. Additionally, other parameters such as features 122 or ethos and standards 130 can also be updated.

Figure 13:
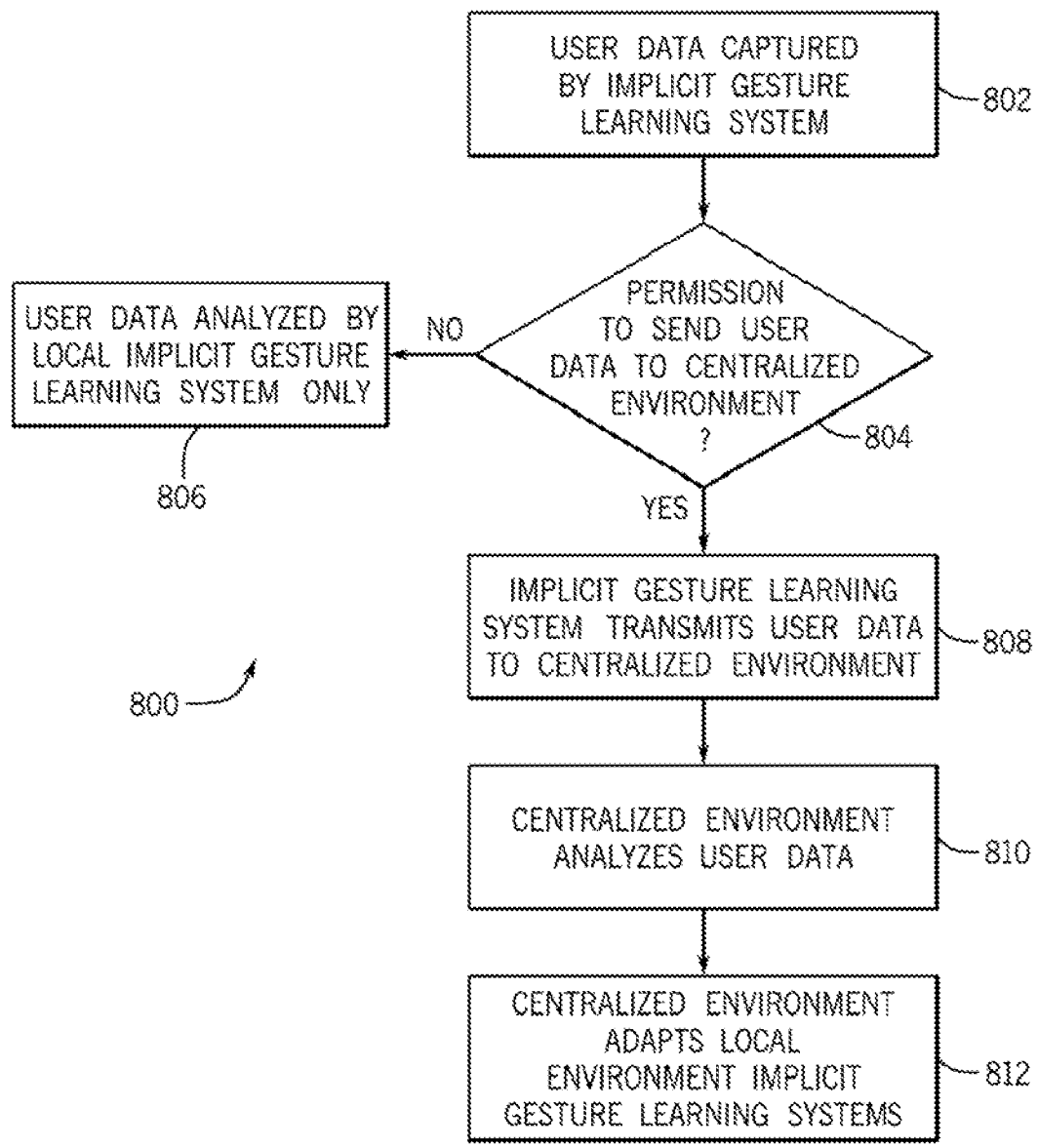
FIG. 13 is a block diagram depicting a local environment system update process.

Turning now to FIG. 13, a local environment system update process 800 can be seen. The local environment system update process 800 can be used to provide updates for certain local environments which can be related to one or more particular environmental factors associated with the particular use instance of the system. For example, it may be desirable to allow for all data accumulated in a particular automobile, home, etc. to be used to adjust one or more global parameters to allow for a more precise application to a particular implementation of the implicit gesture recognition system 100. Thus, it may be advantageous to evaluate user data gathered in home environments differently than user data gathered in vehicular environments due to the different environmental factors associated with each.

At process block 802, user data can be captured by the implicit gesture learning system 100. In one embodiment, user data can be antecedent knowledge 124 stored in the implicit gesture learning system 100. Alternatively, the user data can be precedential knowledge 126 stored in the implicit gesture learning system 100. Furthermore, the user data can be a combination of antecedent knowledge 124 and precedential knowledge 126 stored in the implicit gesture learning system 100. Additionally, other user data, such as features 122, ethos and standards 130 or any other data may also be captured by the implicit gesture learning system 100.

Turning now to process block 804, the local environment system update process 800 can determine if the implicit gesture learning system 100 has permission to send the captured user data to the centralized environment 702. In one embodiment, an individual user 710 can establish permission levels of the implicit gesture learning system 100. The individual user 710 may be able to establish detailed permission levels based on particular aspects of the implicit gesture learning system 100. For example, an individual user 710 may disallow any user data to be shared with the centralized environment 702. The individual user may prohibit data to be shared with the centralized environment 702 to prevent private information from being shared with the centralized environment 702. Additionally, an individual user 710 can allow for only certain information to be sent to the centralized environment 702. For example, an individual user 710 may allow only information relating to hand or arm gestures to be transmitted to the centralized environment. Alternatively, an individual user 710 may not allow any information relating to voice identification or facial recognition to be transmitted to the centralized environment 702. In other instances, the individual user 710 may control permissions associated with other users of the implicit gesture learning system 100. For example, the individual user 710 can prevent the implicit gesture learning system from sending user data to the centralized environment 702 associated with any occupant in the rear passenger compartment of a vehicle.

The implicit gesture learning system 100, not having permission to send user data to the centralized environment 702 for further analysis, can use the captured user data to update the implicit gesture control process 200 at an individual implicit gesture control system 100 level, at process block 806.

The implicit gesture learning system 100, having permission to send user data at process block 804, can transmit the captured user data to the centralized environment 702 at process block 808. The transmission can be initiated at specific times to reduce traffic on the transmission network. In one embodiment, the implicit gesture learning system 100 can transmit user data to the centralized environment 702 whenever new user data is captured. For example, where the implicit gesture learning process 200 inputs a new feature 122 into the antecedent knowledge 126, the implicit gesture control system 100 can transmit the new user data to the centralized environment 702. Alternatively, the implicit gesture control system 100 can transmit the new user data to the centralized environment 702 when the self-healing stage 408 alters previously extracted features 122.

The centralized environment 702, having received the user data transmitted from the implicit gesture learning system 100, can analyze the received user data to determine if the associated features are applicable to a local environment 704, 706, 708 at process block 810. In one embodiment, the centralized environment 702 can aggregate user data from multiple individual users 710 and apply an algorithm to determine which user data is applicable to specific local environments 704, 706, 708. In one embodiment, this algorithm can utilize a statistical analysis to determine which user data is applicable to the centralized implicit gesture learning system 700. Alternatively, the algorithm can use a Markovian process to develop more knowledge based on the user data, and ultimately determine which user data is applicable to the centralized implicit gesture learning system 700. This ability to make global adjustments to particular local environments 704, 706, 708 based on user data gathered from any number of individual users may be employed to improve the overall robustness and precision of multiple implicit gesture learning systems 100.

The centralized environment 702, determining that the received user data is applicable to the local environments 704, 706, 708 can globally update the local environments 704, 706, 708 by transmitting updated local parameters to all the implicit gesture control systems 100 associated with each local environment 704, 706, 708. In one embodiment, the local parameters can modify existing antecedent knowledge 124 and/or precedential knowledge 126. Additionally, other elements such as features 122 or ethos and standards 130 can also be updated.

In one example, local environment 704 can be associated with vehicular environments, local environment 706 can be associated with home environments, and local environment 708 can be associated with commercial environments. The centralized environment 702, receiving user data from multiple implicit gesture control systems 100 can parse the user data based on the local environment 704, 706, 708 associated with each of the multiple implicit gesture control systems 100. The centralized environment 702 can then analyze each of the received user data and determine whether the received user data is globally applicable or, rather, applies to a local environment 704, 706, 708. Where the user data is related to a vehicular application, such as operating power windows in a vehicle, the centralized environment 702 can update all implicit gesture learning systems 100 associated with vehicular local environment 702. Similarly, where the user data is related to home applications, such as interfacing with a home entertainment system, the centralized 702 can update all implicit gesture learning systems 100 associated with home local environment 706. Finally, where the user data is related to commercial applications, such as interfacing with sales displays, the centralized environment 702 can update all implicit gesture learning systems 100 associated with commercial local environment 706. While the above example illustrates three examples of local environments, 704, 706, 708, the type and number of local environments can be vary according to the desired application.

Local environments 704, 706, 708 can also be created to create more precise groupings. For example, local environments 704, 706, 708 may all be associated with vehicular applications; however, each local environment 704, 706, 708 may be associated with a particular subset of vehicular applications. As non-limiting examples, local environment 704 may be associated with passenger vehicles, local environment 706 may be associated with commercial vehicles, and local environment 708 may be associated with military or police vehicles. Thus, where the received user data is related to a specific vehicular application, the centralized environment 702 can update all implicit gesture learning systems 100 associated with the relevant local environment 704, 706, 708. Additionally, in some instances, the centralized environment 702 may determine that the received user data is applicable to more than one local environment 704, 706, 708 and update the relevant local environments 704, 706, 708 accordingly.

Figure 14:
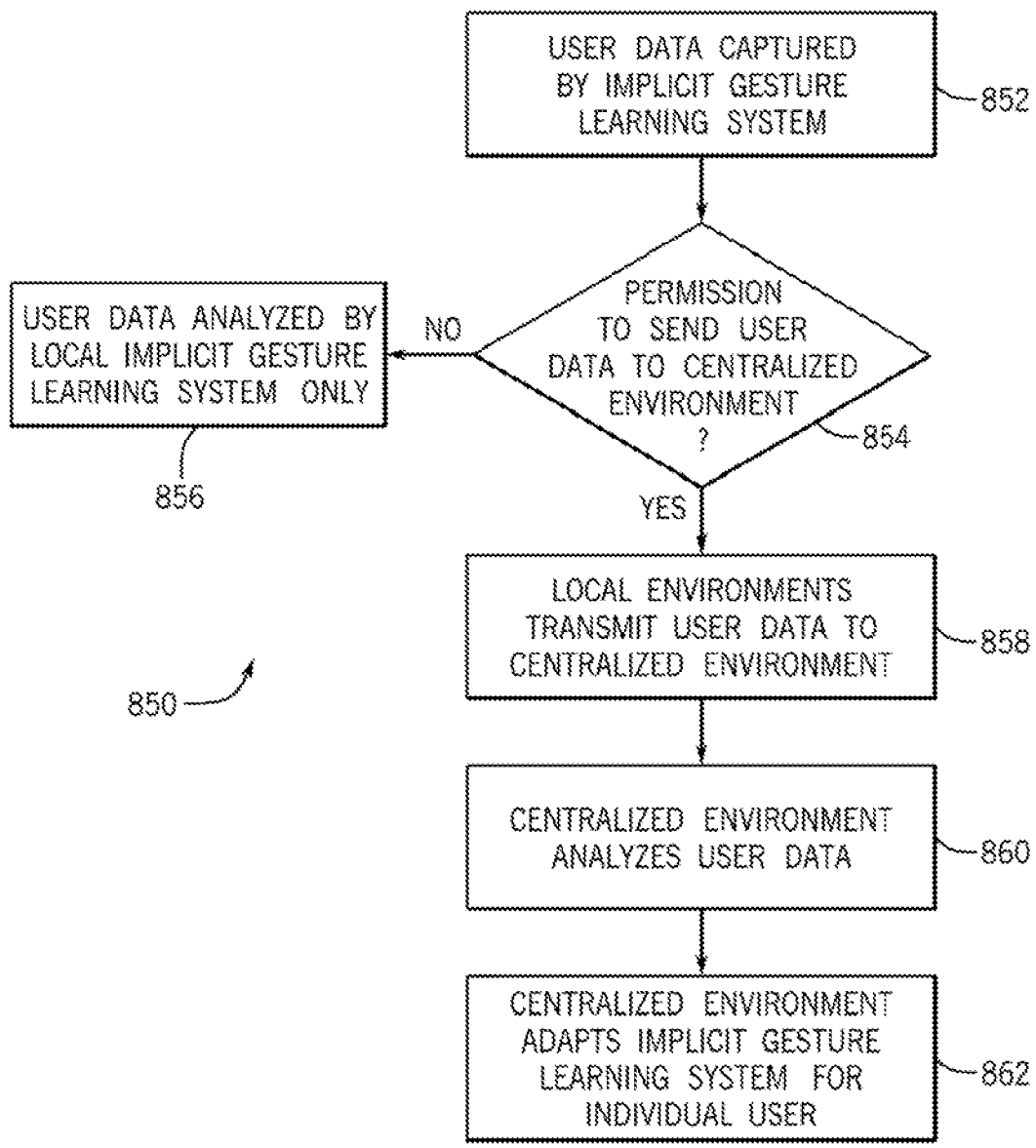
FIG. 14 is a block diagram depicting an individual user update process.

Turning now to FIG. 14, individual user update process 850 can be seen. The individual user update process can be used to provide updates at an individual level. For example, user data associated with an individual user 710 may be used to adjust an individual implicit gesture learning system 100 for an individual user 710. In this manner, any particular user data that is not globally or locally applicable may still be taken into account when determining one or more implicit gestures for an implicit gesture learning system 100.

At process block 852, user data can be captured by the implicit gesture learning system 100. In one embodiment, user data can be antecedent knowledge 124 stored in the implicit gesture learning system 100. Alternatively, the user data can be precedential knowledge 126 stored in the implicit gesture learning system 100. Furthermore, the user data can be a combination of antecedent knowledge 124 and precedential knowledge 126 stored in the implicit gesture learning system 100. Additionally, other user data, such as features 122, ethos and standards 130 or any other data may also be captured by the implicit gesture learning system 100.

Turning now to process block 854, the individual user update process 850 can determine if there is permission to send the captured user data to the centralized environment 702. The implicit gesture learning system 100, not having permission to send user data to the centralized environment 702 for further analysis, can use the captured user data to update the implicit gesture control process 200 at an individual implicit gesture control system 100 level at process block 856.

The implicit gesture learning system 100, having permission to send user data at process block 854, can transmit the captured user data to the centralized environment 702 at process block 858. The centralized environment 702, having received the user data transmitted from the implicit gesture learning system 100, can analyze the received user data to determine if the associated features are applicable to the centralized environment 702 or a local environment 704, 706, 708 at process block 860. The centralized environment 702, determining that the user data is not applicable to the centralized environment 702 or a local environment 704, 706, 708 can update a single implicit gesture learning system 100 for an individual user at process block 862 by transmitting an updated individual parameter to the single implicit gesture learning system 100. In one embodiment, the updated individual parameter can modify existing antecedent knowledge 124 and/or precedential knowledge 126. Additionally, other elements such as features 122 or ethos and standards 130 can also be updated.

The hierarchical application of the centralized implicit gesture learning system 700 as shown in FIGS. 12-14 allows for the incorporation of a wide array of accumulated data into the global system, while maintaining implementation and user level detail for ideal implementations in each scenario.

Furthermore, the implicit gesture learning system 100 can additionally contain one or more tutorial programs to further increase the usability of the system. In one embodiment, a user may initiate a tutorial program in order to better understand all or a portion of a gesture control system. Further, the implicit gesture learning system 100 itself may recognize the need to educate or train a user to allow the user to more effectively utilize the features of a gesture control system. Finally, an implicit gesture learning system 100 may be able to actively teach or suggest certain gestures to a user based on recognized patterns learned over time. This dynamic gesture creation and/or teaching process can provide a user with a richer experience as the user and the system 100 can teach and guide each other to present the user with a highly customizable gesture control system.

Figure 15A:
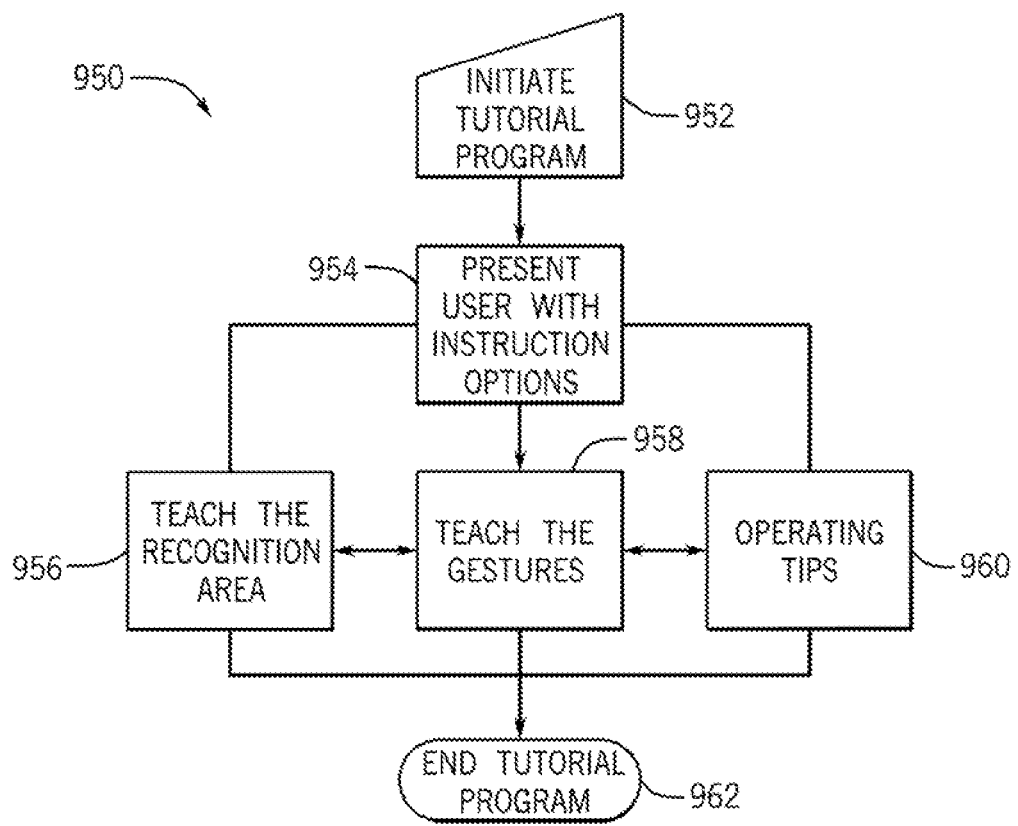
FIG. 15A is a block diagram depicting a user initiated tutorial program.

Turning now to FIG. 15A, an example method for providing a user-initiated tutorial program 950 can be seen. At process block 952, a user initiates the tutorial program. In one embodiment, the user can initiate the tutorial program via a manual input, such as a "tutorial" button associated with the implicit gesture learning system 100. Alternatively, the user may initiate the tutorial program using a gesture such as a hand motion or a voice command. The user-initiated tutorial program 950, having been initiated at process block 952, can then present the user with instruction options at process block 954. In one embodiment, the implicit gesture learning system 100 can present the instruction options to the user via audio feedback, such as audio instructions transmitted through the audio system of a vehicle via the vehicle interface module 116. Alternatively, the implicit gesture learning system 100 can present the instruction options to the user via a visual display. For example, an infotainment system in a vehicle could be used to display the instruction options to the user. In one embodiment, the user-initiated tutorial program 950 can present instruction options to teach the user a gesture recognition area or a plurality of pre-defined gestures; further, the user-initiated tutorial program 950 can present an instruction option to provide useful tips to the user.

The user-initiated tutorial program 950, upon the user selecting the option to teach the recognition area, can teach the recognition area at process block 956. In one embodiment, the user-initiated tutorial program 950 may teach the user by illuminating a colored light if the user's hand is in the field of view of the visual sensors 104 and an alternatively colored light when the user's hand is not in the field of view of the visual sensors 104. For example, where the user's hand is in the field of view of the visual sensors 104 (i.e., the user's hand is in a location that can be observed by the system), the user-initiated tutorial program 950 may illuminate a green light; and where the user's hand is not in the field of view of the visual sensors 104, the user-initiated tutorial program 950 may illuminate a red light. Alternatively, the user-initiated tutorial program 950 may provide an audio signal when the user's hand is in the field of view of the camera. The user initiated tutorial program may further provide a second audio signal when the user's hand is in the field of view of the camera. Additionally, the user-initiated tutorial program 950 may visually display the field of view of the visual sensors 104 on a display device, such as an infotainment system in a vehicle. The display may be taken from the point of view of the visual sensors 104, enabling the user to see what the visual sensors 104 see and more accurately position the user's hand within the field of view of the visual sensors 104. Further, the user-initiated tutorial program 950 can combine audio or visual indications with the visual display of the visual sensors 104 field of view, helping to ensure that gestures are conducted in the recognition area.

Figure 15B:
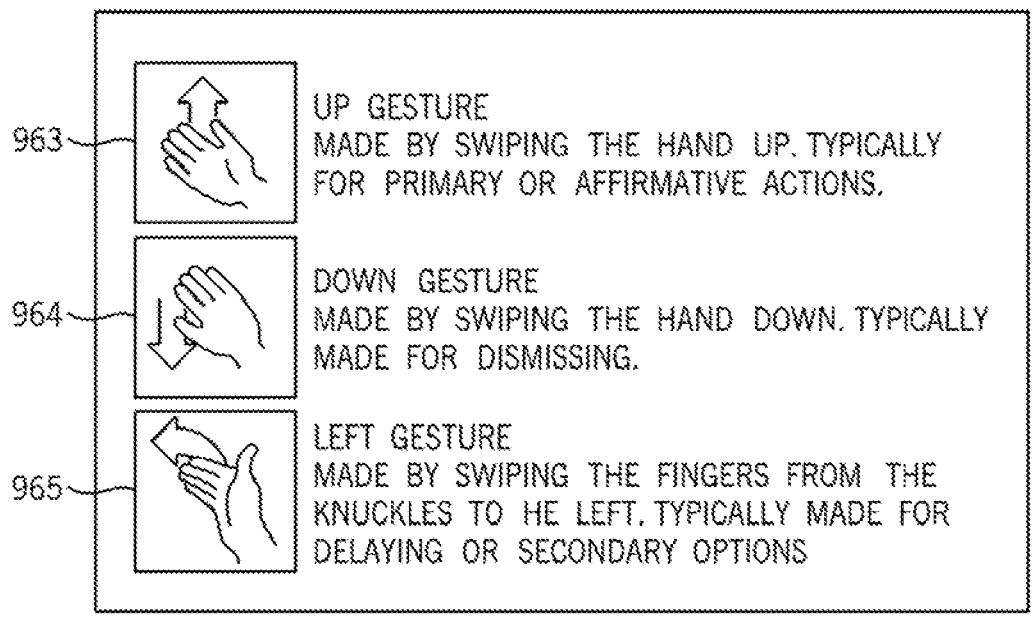
FIG. 15B depicts an example implementation of teaching basic gesture operation.

The user-initiated tutorial program 950, upon the user selecting the option to teach the plurality of pre-defined gestures, can teach the plurality of pre-defined gestures to the user at process block 958. In one embodiment, the user-initiated tutorial program 950 can teach a plurality of pre-determined gestures to a user for specific function. For example, the implicit gesture learning system 100 may have certain gestures pre-associated with certain commonly-used actions, such as increasing the volume of an infotainment system, or placing a phone call. However, it should be known that many different actions could be pre-associated with a given gesture. Additionally, the user-initiated tutorial program 950 can teach a plurality of pre-determined gestures to a user for basic gesture-based operations. FIG. 15B shows a presentation of three gestures that can be associated with basic gesture-operations, such as the up gesture 963, the down gesture 964 and the left gesture 965 shown in FIG. 15B. Each gesture 963, 964, 965 shown in FIG. 15C can be associated with basic gesture operations. As an example, up gesture 963 can be associated with "primary" or "affirmative" actions.

Figure 15C:
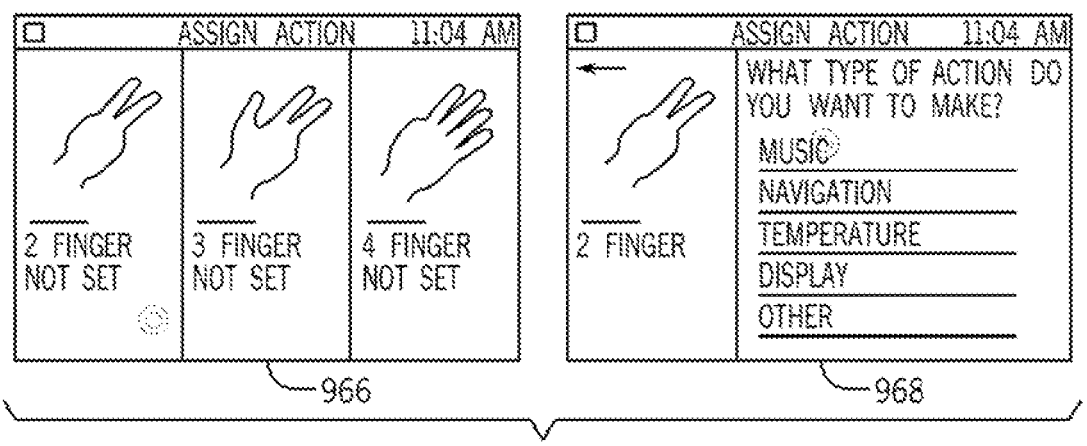
FIG. 15C depicts an example implementation of teaching certain gestures from a predefined list.

Alternatively, the user-initiated tutorial program 950 can allow a user to select certain gestures from a pre-determined list and allow the user to choose a particular action to be associated with a given gesture. For example, a user may select a pre-determined gesture, such as a right-to-left swiping gesture, and associate that gesture with an action such as scrolling through pre-set radio stations. Additionally, the user-initiated tutorial program 950 may be able to visually present pre-determined gestures to the user using a display device. The user-initiated tutorial program 950 may, in some examples, present the plurality of pre-determined gestures to the user using a still image or a sequence of still images. Alternatively, the user-initiated tutorial program 950 may present the plurality of pre-determined gestures to the user using an animated or pre-recorded video. FIG. 15C shows an example implementation of allowing a user to select certain gestures from a pre-determined list. In FIG. 15C, a gesture selection screen 966 can present a plurality of gestures for a user to select from. A user can select one of the gestures in the gesture selection screen 966, for example, the gesture "2 Finger". Once the user has selected the desired gesture, an action selection display 968 can be presented to the user with a plurality of actions. The user can then subsequently select an action to associate with the previously selected gesture.

Figure 16A:
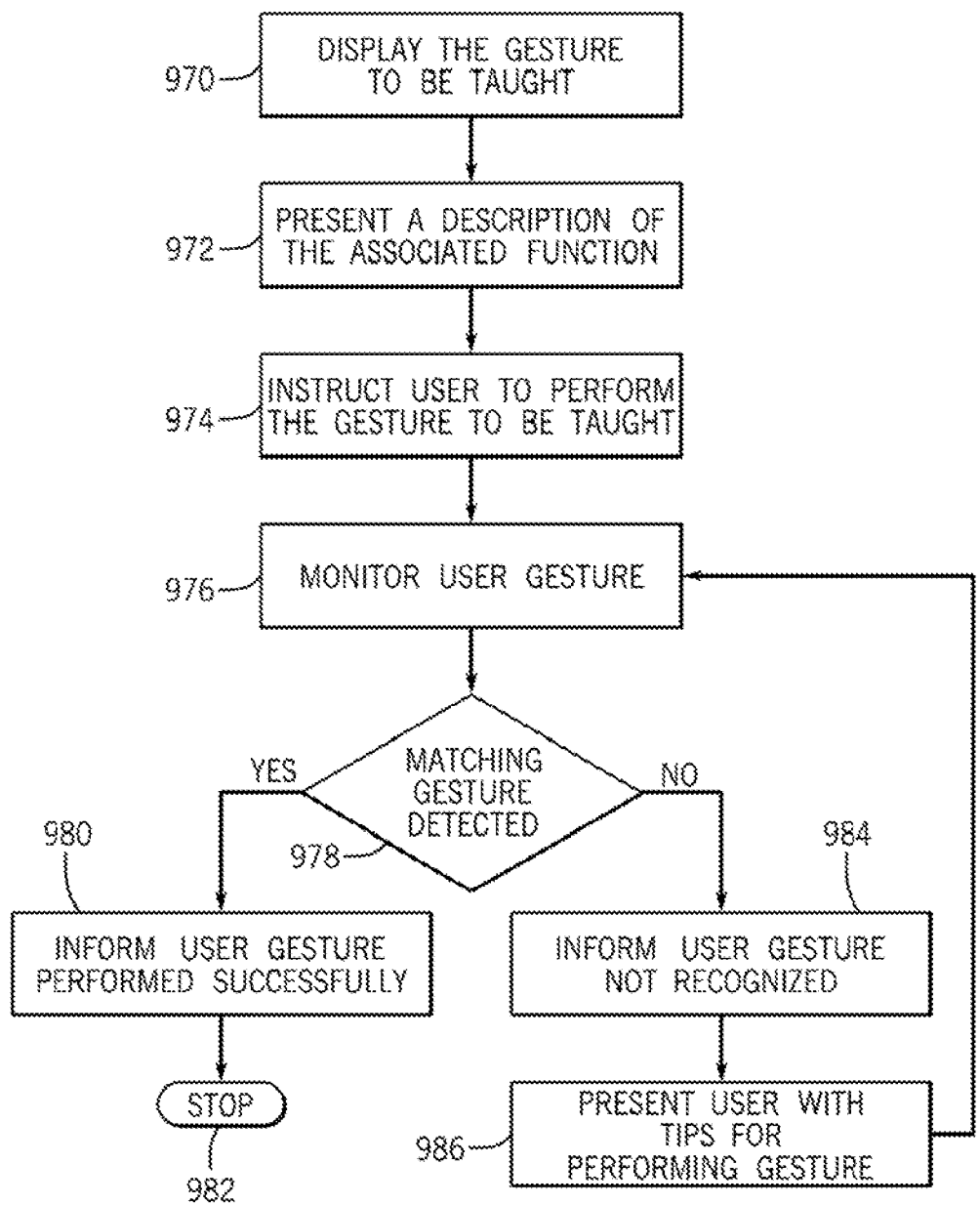
FIG. 16A is a block diagram depicting a predetermined gesture teaching process.

Turning briefly to FIG. 16A, an example process for teaching a predetermined gesture can be seen. At process block 970, the user-initiated tutorial program 950 can teach a pre-determined gesture to a user for a function by first visually displaying a representation of the predetermined gesture to the user using a display device. In one example, the user-initiated tutorial program 950 can display the representation of the predetermined gesture using a vehicle infotainment system. In one embodiment, the representation of the predetermined gesture can be a still image. Alternatively, the representation of the predetermined gesture can be an animated image, showing the gesture being performed. It should be known that any type of visual representation that can be displayed can be used to provide a representation of the gesture. At process block 972 a description of the associated function (e.g. turning the volume up on the infotainment system) can be provided to the user. In one embodiment, the description of the associated function can be visually displayed to the user using the infotainment system. The description can be a text description, a pictorial description, or a combination thereof. Alternatively, the description of the associated function can be provided to the user via audio feedback. Additionally, the description of the associated function can be provided to the user both visually and audibly.

Figure 16B:
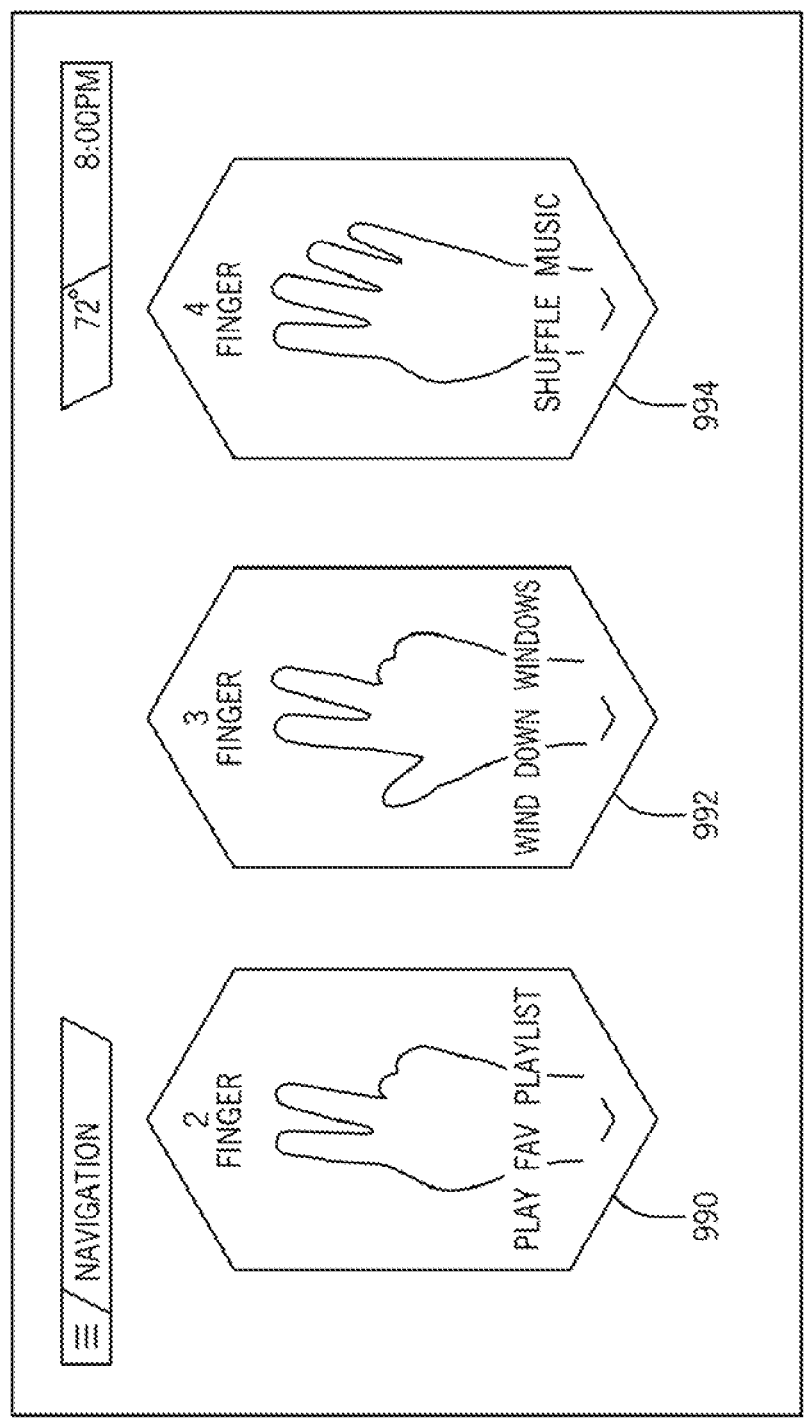
FIG. 16B is an exemplary illustration showing possible predetermined gestures.

FIG. 16B provides an exemplary illustration showing possible pre-determined gestures 990, 992, 994 that can be presented by the user-initiated tutorial program 950 at process block 970 for the functions "Play Favorite Playlist" 990, "Wind Down Windows" 992 and "Shuffle Music" 994. As shown in FIG. 16B, "Play Favorite Playlist" 990 can be associated with using a two finger gesture, "Wind Down Windows" 992 can be associated with using a three finger gesture, and "Shuffle Music" 994 can be associated with using a four finger gesture. In one embodiment, the user can select one of the possible pre-determined gestures 990, 992, 994, and the user-initiated tutorial program 950 can provide a detailed description of the associated function at process block 972.

Turning now to process block 974 the user-initiated tutorial program 950 can instruct the user to perform the predetermined gesture. The user-initiated tutorial program 950 can instruct the user to perform the predetermined gesture using an audio command. Alternatively, the user-initiated tutorial program 950 can instruct the user to perform the predetermined gesture visually using the infotainment system. The user-initiated tutorial program 950 can monitor for the user to perform the predetermined gesture at process block 976. In one embodiment, the user initiated tutorial program can monitor for the user to perform the predetermined gesture using the visual sensors 104. The user-initiated tutorial program 950 can then determine if a gesture matching the predetermined gesture has been detected at process block 978. The gesture matching the predetermined gesture being detected, the user-initiated tutorial program 950 can inform the user that they have performed the predetermined gesture successfully at process block 980. Once the user has performed the predetermined gesture successfully, the user-initiated tutorial program 950 can stop teaching that particular predetermined gesture at process block 982.

Where the gesture matching the predetermined gesture is not recognized at process block 978, the user-initiated tutorial program 950 can inform the user that the predetermined gesture was not recognized at process block 984. In one embodiment, the user-initiated tutorial program 950 can inform the user via an audio signal that the predetermined gesture was not recognized. Alternatively, the user-initiated tutorial program 950 can inform the user via a visual indication that the predetermined gesture was not recognized. After informing the user that the predetermined gesture was not recognized, the user-initiated tutorial program 950 can present the user with tips for performing the predetermined gesture at process block 986. For example, the user-initiated tutorial program 950 may suggest that the user perform the predetermined gesture at a different speed. Alternatively, the user-initiated tutorial program 950 may suggest that the user orient their hand a different way. Further, the user-initiated tutorial program 950 may instruct the user to place their hand in a different location when performing the gesture when the user-initiated tutorial program 950 determines that the user's hand is not fully in the field of view of the visual sensors 104. However, it should be known that the tips presented by the user initiated tutorial program may be any tip which can improve the probability that the gesture is recognized. After presenting the user with tips for performing the predetermined gesture at process block 986, the user-initiated tutorial program 950 can continue monitoring for the predetermined gesture at process block 976. Alternatively, the user-initiated tutorial program 950 may present the user with an option to try again or to stop the user-initiated tutorial program 950 after presenting the user with tips for performing the predetermined gesture at process block 986.

Returning now to FIG. 15A, the user-initiated tutorial program 950, upon the user selecting the option to teach the gestures, can also present a user with operating tips at process block 960. In one example, the operating tips can be suggestions such as performing gestures slowly. In a further example, the operating tips can provide additional information relating to teaching new gestures to the implicit gesture learning system 100. These operating tips can be pre-determined and stored in the implicit gesture learning system 100 at the time of manufacture. Alternatively, the operating tips can be updated over time. For example, where the implicit gesture learning system 100 can communicate over a network such as Wi-Fi or via a cellular network (3G, 4G, LTE, etc.), updates can be downloaded into the user initiated tutorial program to provide additional operational tips as they become available. Additionally, operating tips can be outputs associated with an implicit gesture. For example, the operating tips can turn on an overhead lamp as the user approaches the button or switch responsible for operating the overhead lamp, such that the user can eventually learn to point in the direction of the overhead lamp button or switch in order to operate the overhead lamp.

A user can select any of the above instruction options in any order. Further, in one embodiment, a user could have access to the other instruction options while in a first instruction option. For example, the user-initiated tutorial program 950 may be teaching the recognition area at process block 956. Subsequently, the user can then instruct the user-initiated tutorial program 950 to move on to teaching the plurality of pre-determined gestures at process block 958. Additionally, the user-initiated tutorial program 950 can present the user with an option to move to another instruction option when the current instruction option is completed. For example, the user-initiated tutorial program 950 completing the instruction option of teaching the plurality of pre-defined gestures at process block 958 can then proceed to providing the user with operating tips at process block 960. The user initiated tutorial program can make this transition automatically, or, alternatively, can ask a user if they would like to proceed to the next instruction option. Finally, the user-initiated tutorial program 950 ends at process block 962. The user-initiated tutorial program 950 can end when all of the instruction options are complete. Further, the user-initiated tutorial program 950 may also end when the implicit gesture control system determines that it is unsafe to perform the tutorial, such as when a vehicle is in motion. Alternatively, the user-initiated tutorial program 950 can end when a user terminates the tutorial.

Figure 17:
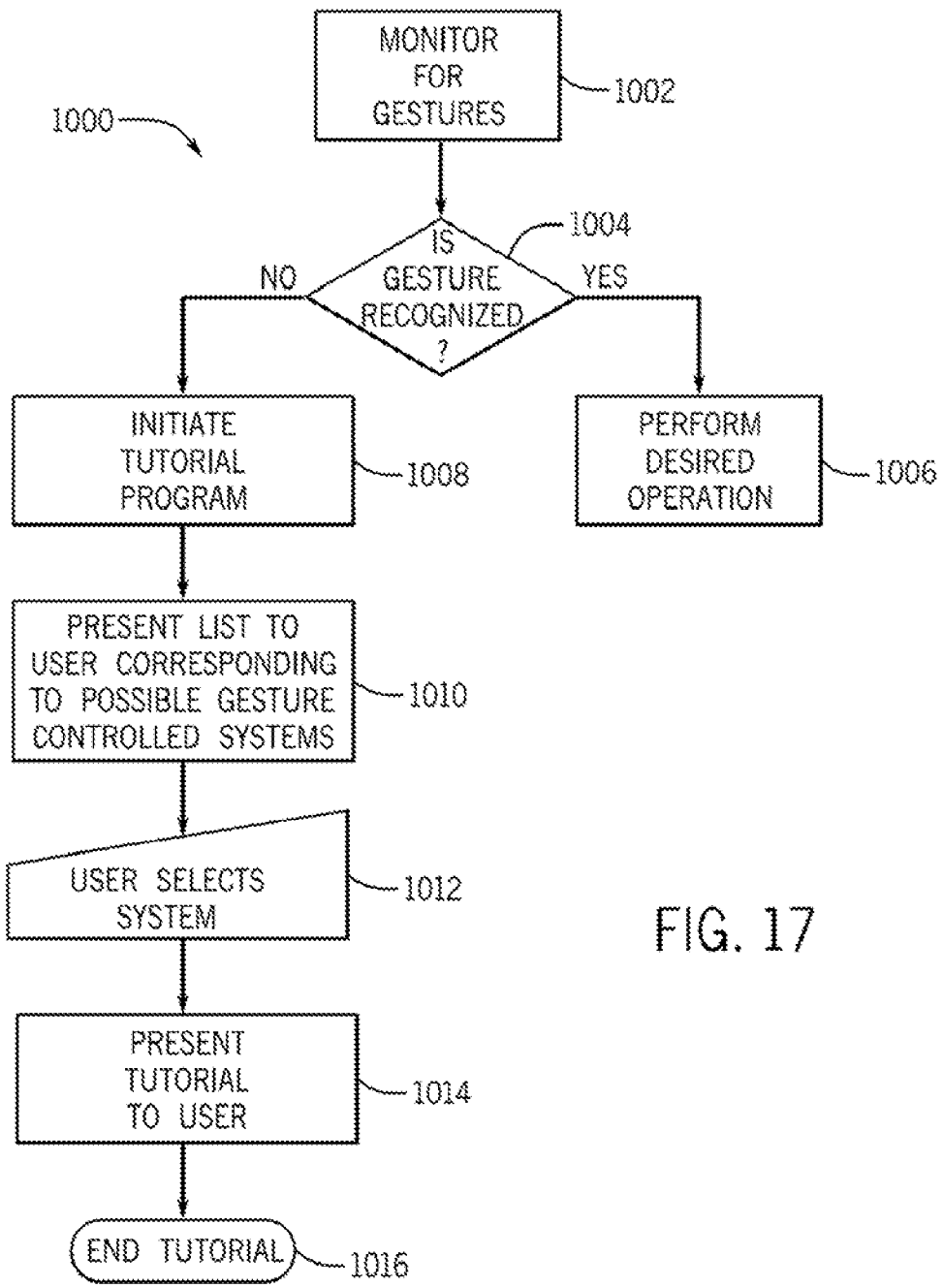
FIG. 17 is a block diagram depicting a system initiated tutorial program.

Turning now to FIG. 17, an example method for implementing a tutorial program 1000 can be seen. At process block 1002, the implicit gesture learning system 100 can monitor for pre-defined gestures to be made by a user. In one embodiment, the pre-defined gestures can be common gestures pre-defined in the implicit gesture learning system 100. However, the pre-defined gestures could also be previously learned implicit gestures. At process block 1004, the implicit gesture control system 100 can determine if the gesture is recognized, and, if so, perform the desired operation associated with the recognized gesture at process block 1006.

Where the implicit gesture learning system 100 fails to recognize the gesture, it can initiate the system initiated tutorial program 1000 at process block 1008. The system initiated tutorial program 1000 can present a list of possible desired operations to the user that correspond to possible gesture control systems at process block 1010. The list of possible desired operations can be visually presented to the user via a visualization device, such as a vehicle infotainment system. In one embodiment, the system-initiated tutorial program 1000 can select a limited list of operations to present to a user that are similar in nature to the gesture detected by the implicit gesture control system 100. Additionally, the system-initiated tutorial program 1000 may use other available data to determine which gestures to present to the user. In one embodiment, the system-initiated tutorial program 1000 may look at the most recent vehicle system activated prior to or after an unrecognized gesture is detected. The system-initiated tutorial 1000 may then present a user with a list of gesture options that correspond to performing an action associated with the most recent vehicle system activation at process block 1010. For example, where an incoming phone call has been detected prior to the unrecognized gesture being detected, the system initiated tutorial program 1000 may present the user, at process block 1010, with a list of options that correspond to performing an action associated with an incoming phone call, such as answering and/or declining the incoming call. Alternatively, the system initiated tutorial 1000 may present the user with infrequently used commands which with the user may be unfamiliar. Additionally, the system-initiated tutorial program 1000 can present a list of the systems that can be controlled by the implicit gesture learning system 100 and allow the user to select systems and associated subsystems through a tree-type structure until the desired operation is selected.

At process block 1012 the user can select the desired operation. In one embodiment, the user can select the desired operation using a verbal command. Alternatively, the user can select the desired operation from a list of displayed operations. For example, a user can select the desired operation from a list of possible operations on a touch-screen enabled device, such as a vehicle infotainment system. Alternatively, a user can select a system that allows for gesture control. For example, a user can select a system such as a climate control system that is able to be controlled by gesture control.

Once the user selects a desired system or operation at process block 1012, the system-initiated tutorial program 1000 can present a tutorial to the user that corresponds to the system or operation selected by a user at process block 1014. For example, if a user selects a desired operation of "increase the passenger compartment temperature", the system initiated tutorial program may present the user with a tutorial that illustrates only how to use gestures to increase the cabin temperature. Alternatively, or in conjunction with, the system may then present the user with other related gestures commands, such as lower the passenger compartment temperature, recirculate, defrost, etc. The user may then select one of the related commands and the system initiated tutorial program 1000 will again present the user with a tutorial based on the user's input. Where a user selects a desired system instead of a distinct operation, the system initiated tutorial program 1000 can present the tutorial associated with using gesture control with the selected system at process block 1014. For example, if a user selects the climate control system, the system initiated tutorial program 1000 can present the tutorial associated with using the climate control system in general, cycling through all of the pre-determined gesture commands associated with operating the climate control system.

The system initiated tutorial program 1000, upon presenting the required tutorial to the user at process block 1014, can then end the tutorial at process block 1016. Alternatively, a user may manually cancel or end the system initiated tutorial process 1000, thereby ending the tutorial at process block 1016.

Figure 18:
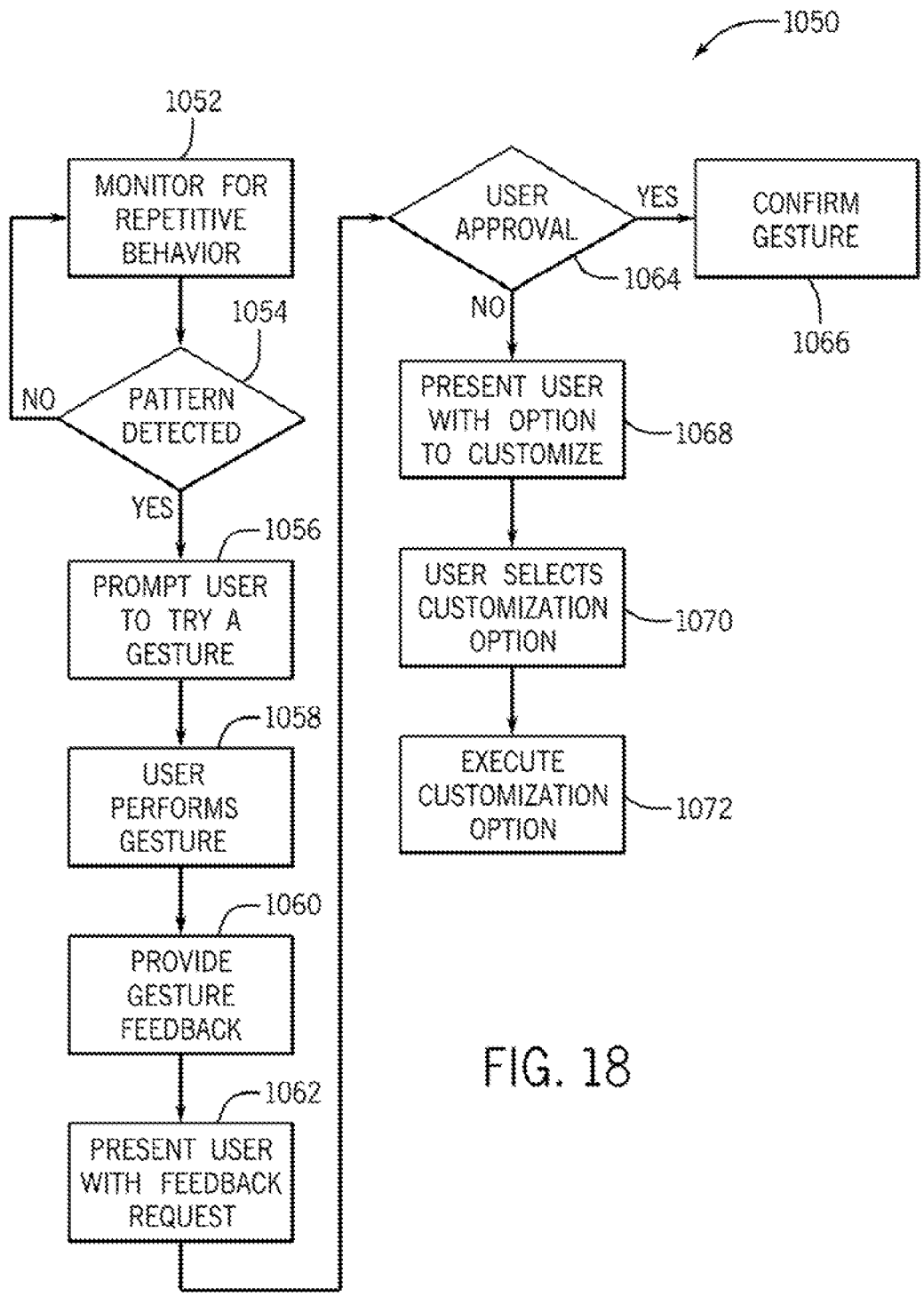
FIG. 18 is a block diagram depicting a smart gesture control tutorial system.

Turning now to FIG. 18, an example method for implementing a smart tutorial program 1050 can be seen. At process block 1052, the smart tutorial program 1050, using the implicit gesture learning system 100, can monitor user actions for repetitive behavior. In one embodiment, the smart tutorial program 1050 can monitor user action for repetitive behavior by monitoring a plurality of system inputs 204. For example, a user may perform certain repetitive tasks using a vehicle infotainment system associated with their daily drive home from work. The user may immediately check traffic information using the navigation system, resulting in a navigation system being active. The user may then text a spouse to inform them that they are on their way home, resulting in a phone system being active. Finally, the user may then select a music channel, resulting in a music/entertainment system being active. The smart tutorial program 1050 can monitor this behavioral data over time and eventually identify behavioral patterns. At process block 1054, the smart tutorial program 1050 can determine if a behavioral pattern has been detected. If no behavioral pattern has been detected, the smart tutorial program 1050 will continue to monitor user behavior at process block 1052.

In one embodiment, the smart tutorial program 1050 may detect a behavioral pattern at process block 1054, correlating actions taken at approximately the same time every day. For example, checking the traffic conditions every workday at approximately 5 p.m. Thus, over the course of several days, the smart tutorial program may be able determine a behavioral pattern.

The smart tutorial program 1050, detecting a pattern, may then prompt the user to try a gesture at process block 1056. For example, the smart tutorial program 1050 may output an audio signal to inform the user that a suggestion is going to be presented. The audio signal could be a simple tone, or a voice prompt such as "try this!" Subsequently, the smart tutorial program 1050 can display a suggested gesture to the user. In one embodiment, the gesture can be presented to the user using a visual display device, such as the visual display in a vehicle infotainment system. For example, the smart tutorial program 1050 may instruct the user to try a gesture such as drawing the letter "V" in the air using a finger. However, the smart tutorial program 1050 could suggest any number of gestures recognizable by the implicit gesture learning system. Alternatively, the smart tutorial program 1050 may prompt the user to use an audio gesture. For example, the smart tutorial program 1050 may instruct the user to say the word "home".

The user, being presented with the prompt to perform a gesture by the smart tutorial program 1050 can perform the suggested gesture at process block 1058. At process block 1060, the smart tutorial program 1050 can provide gesture feedback. In one embodiment, the smart tutorial program 1050 can provide gesture feedback by performing one or more actions associated with the suggested gesture. In the example above of the user driving home after work, the smart tutorial program 1050 can direct the implicit gesture learning system 100 to execute one or a series of actions based on the detected patterns. Continuing with the above example, the smart tutorial program 1050 may have the implicit gesture control system 100 first execute plotting the route home using a navigation system and factoring in available traffic information. Next, the smart tutorial program 1050 may have the implicit gesture control system 100 then execute the phone system so that the user can send a message to their spouse to let them know they are on their way home. In one embodiment, the smart tutorial program 1050 can have the implicit gesture learning system 100 prepare a draft text message for the user with a standard message based on previously detected messages. Further, the smart tutorial program 1050 can have the implicit gesture control system 100 prepare a draft text message to inform a user's spouse that they are on their way home and further provide an estimated time of arrival based on the current traffic conditions. Finally, the smart tutorial program 1050 can then direct the implicit gesture learning system 100 to execute the music menu to allow the user select a desired music/entertainment channel. Further, if the smart tutorial program 1050 has sufficient data, it can tune the music system to the desired music channel based on previously detected patterns. In one embodiment, the smart tutorial program 1050 may evaluate the current time and past music channel selections and present the user with a desired music/entertainment channel.

After the smart tutorial program 1050 provides gesture feedback at process block 1060, it can then present the user with a feedback request at process block 1062. In one embodiment, the smart tutorial program 1050 can request feedback by having the user respond as to whether they approve of the suggested gesture. Alternatively, the smart tutorial program 1050 can request feedback by having the user respond as to whether they approved of the actions performed as a result of the gesture. The smart tutorial program 1050 can also ask for feedback for both the suggested gesture and the actions performed as a result of the gesture.

Once the user has been provided with a feedback request at process block 1062, the user can then choose to approve or not approve the gesture and/or the associated actions at process block 1064. If the user approves the gesture and/or the associated actions at process block 1064, the smart tutorial program 1050 can confirm the gesture and/or associated actions at process block 1066. By confirming the gesture and/or associated actions, the smart tutorial program can associated one or more actions that correspond to the gesture, such that if the gesture is detected, the one or more actions associated with the gesture can be executed by the implicit gesture learning system 100. Additionally, once the gesture and/or associated actions are confirmed, the smart tutorial program 1050 can place the gesture and associated actions into the memory device 120 of the implicit gesture learning system 100 for future execution. The gesture and associated actions can also be stored in a database once the gesture and/or associated actions are confirmed. In one embodiment, the database can be located on a cloud based server 554. Alternatively, the database can be located on-board the vehicle, such as in the memory device 120.

Figure 19:
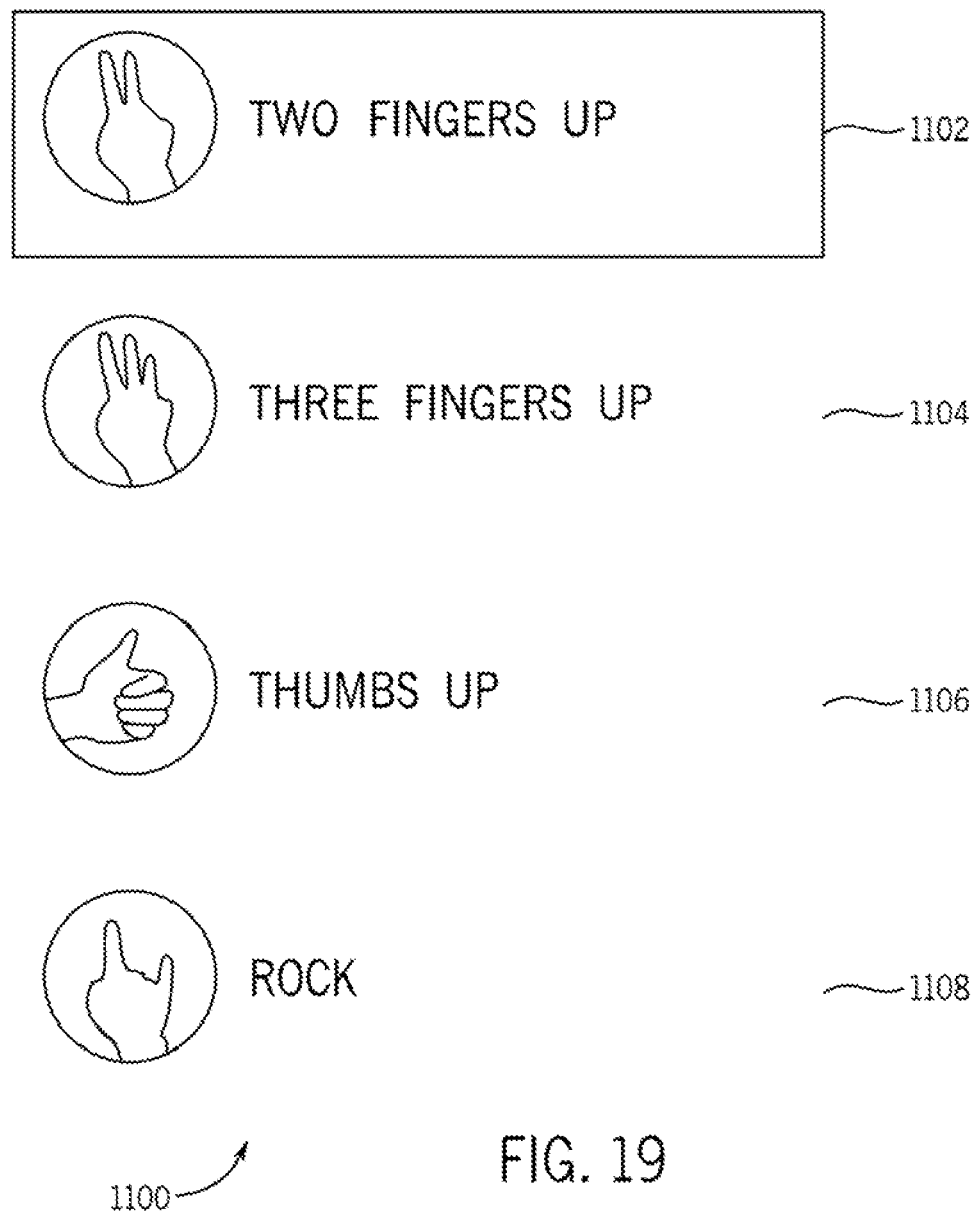
FIG. 19 is an exemplary grid of predefined gesture glyphs.

If the user, at process block 1064, does not approve of the gesture, the smart tutorial program 1050 can present the user with options to customize the gesture at process block 1068. In one embodiment, if the user does not approve of the gesture at process block 1064, the smart tutorial system 1050 can present the user with the option to choose a different gesture from a list of predetermined gestures stored in the memory device 120 of the implicit gesture learning system 100. These pre-determined gestures can be presented to a user visually as a grid of predefined gesture glyphs. Turning briefly to FIG. 19, an example grid of predefined gesture glyphs 1100 can be seen. Example predefined gesture glyphs 1100 can include "Two Fingers Up" 1102, "Three Fingers Up" 1104, "Thumbs Up" 1106 and "Rock" 1108. Returning to FIG. 18, the user can then select a desired gesture glyph at process block 1070 and the smart tutorial program 1050 will then execute the selected customization option at process block 1072. The smart tutorial program 1050 can execute the selected customization option by storing the selected gesture glyph into the memory device 120 along with the associated actions to be executed when the gesture is recognized.

Alternatively, if the user does not approve of the actions associated with the suggested gesture, the smart tutorial program 1050 can present the user with options to customize the associated actions at process block 1068. In one embodiment, if the user does not approve of the actions associated with the suggested gesture, the smart tutorial program 1050 can visually present each of the associated actions to the user. The user can then select and modify the associated actions at process block 1070 using an input device such as the touch screen device. Alternatively, the user can select and modify the associated actions at process block 1070 using an audio input such as a voice command. In a further embodiment, the user may also be able to add or delete associated actions. Once the user has completed selecting the desired customization of the associated actions, the smart tutorial program 1050 can execute the selected customization options at process block 1072.

Finally, the user can also select, at process block 1068 to not accept the suggested gesture and associated actions at all. Where the user has chosen not to accept the suggested gesture and associated action at process block 1068, the smart tutorial program 1050 can cancel the gesture and associated actions at process block 1072. In one embodiment, where the implicit gesture learning system 100 is capable of distinguishing between users, the smart tutorial program 1050 can remember that it should not suggest a particular gesture to a user, where the user has indicated they do not wish to use gesture control.

The tutorial programs of the implicit gesture learning system 100 shown in FIGS. 15-18 allows for a user to have a more personal relationship with a gesture controlled system, such as a vehicle. By presenting the user with tutorial programs, the user feels more involved as they can help to teach and guide the system to accommodate the user's needs. Further tutorial programs help to highlight available features while educating a user as to their functionality.

Various embodiments of the present invention may be embodied in many different forms, including, but in no way limited to, computer program logic for use with a processor (e.g., a microprocessor, micro controller, digital signal processor, server computer, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as C, C++, or JAVA) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The various embodiments of the invention may be extended to areas outside of the automobile. For example, any implicit action performed by a user may be employed to determine an input corresponding to one or more desired outputs. Furthermore, any indirect or implicit corrective action performed by the user may be further employed to self-heal the system in a manner corresponding to the corrective action. Thus, by way of a non-limiting example, if a user gets out of bed at night and walks down a hallway, a light in a room at the end of the hallway may be switched on. If the user then turns off the light in the room at the end of the hallway, and instead turns on the light in the bathroom, the system is able to correct its initial action and substitute the alternative action in future iterations by learning and integrating a set of features that are associated with such actions. Such features may be spatio-temporal or they may be frequency based. They may also be extracted in a separate feature-rich space based on any number of salient information. Of course, if any distinction between the user's action when turning on the light in the room and the light in the bathroom can be discerned, it is possible to classify the user actions as two different inputs, thereby resulting in two different outputs.

Thus, any number of inputs from any number of users via the Internet of Things/Connected Devices may be employed. Thus, by further non-limiting example, inputs received by any number of sensors in the home or car of a user may be employed to give a more complete picture of the implicit actions of the user, and thereby provide a more advanced system for classifying action, and for healing any artificial intelligence system, resulting in improved system performance and better user experiences.

The computer program may be fixed in any form (e.g., source code form, computer executable form, or an intermediate form) in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), a PC card (e.g., PCM-CIA card), or other memory device. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or temporarily in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), or other memory device. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present disclosure describes preferred embodiments with reference to the Figures, in which like numbers represent the same or similar elements. Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment", and similar language throughout this specification may, but do not necessarily, all refer to the same embodiment.

The described features, structures, or characteristics of the invention may be combined in any suitable manner in one or more embodiments. In the description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Some embodiments provided for are described as computer-implemented method claims. However, one of ordinary skill in the art would realize that the method steps may be embodied as computer code and the computer code could be placed on a tangible, non-transitory computer readable medium defining a computer program product.

Although the above discussion discloses various exemplary embodiments of the invention, it should be apparent that those skilled in the art can make various modifications that will achieve some of the advantages of the invention without departing from the true scope of the invention.

What is claimed is:

1. A method, comprising:
monitoring a plurality of system inputs;
detecting a behavioral pattern performed by a user and associated with the plurality of system inputs;
when the behavioral pattern is detected, associating, in a memory, a gesture with at least one action, the at least one action being determined by the plurality of system inputs, wherein the action associated with the gesture enables a plurality of system outputs;
monitoring a subsequent input, wherein the subsequent input is associated with a contradictory vehicle output canceling one of the plurality of system outputs;
determining whether the subsequent input is associated with a negative driving behavior; and
initiating a self-healing action based on the subsequent input being associated with the contradictory vehicle output and based on whether the subsequent input is associated with the negative driving behavior, wherein the self-healing action is associated with a desired vehicle output.

2. The method of claim 1, including presenting the user with a plurality of options to customize the gesture.

3. The method of claim 2, wherein the plurality of options to customize the gesture includes presenting the user with a plurality of pre-defined gestures, the user being able to select a desired gesture from the plurality of pre-defined gestures.

4. The method of claim 2, further including the steps of presenting the user with a plurality of actions to associate with the gesture.

5. The method of claim 4, wherein the plurality of actions to associate with the gesture includes allowing the user to at least one of add and remove actions associated with the gesture.

6. The method of claim 1, wherein the plurality of system inputs correspond to a plurality of sub-systems.

7. The method of claim 1, comprising initiating the self-healing action based on a Markovian process.

8. The method of claim 1, comprising initiating the self-healing action based on a threshold number of subsequent inputs being associated with the contradictory vehicle output canceling one of the plurality of system outputs.

9. The method of claim 1, comprising initiating the self-healing action based on a time of day or a percentage of time that the contradictory vehicle output is detected.

10. A method for developing customized gestures in an implicit gesture control system based on user behavior, comprising:
monitoring a plurality of actions performed by a user;
detecting behavioral patterns associated with the plurality of actions performed by the user;
correlating a series of system outputs to the detected behavioral patterns;
instructing the user to perform a suggested gesture, the suggested gesture associated with the series of system outputs;

executing the series of system outputs when the user performs the suggested gesture;

instructing the user to accept or reject the executed series of system outputs associated with the suggested gesture;

determining whether the suggested gesture is associated with a negative driving behavior; and initiating a self-healing action when the user rejects the executed series of system outputs associated with the suggested gesture, the self-healing action based on a subsequent input associated with a contradictory output canceling one of the executed series of system outputs and based on whether the suggested gesture is associated with the negative driving behavior, wherein the self-healing action is associated with a desired vehicle output.

11. The method of claim 10, wherein the user is instructed to perform the suggested gesture by an audio command.

12. The method of claim 10, wherein the user is instructed to perform the suggested gesture by a visual command.

13. The method of claim 10, wherein the user is instructed to perform the suggested gesture automatically after a behavioral pattern has been detected.

14. A learning tutorial system, the system comprising:
a processor, the processor in communication with a plurality of sensors coupled to a vehicle;
the processor being configured to perform the steps of:
monitoring a plurality of system inputs;
detecting behavioral patterns associated with the plurality of system inputs;
prompting a user to perform a gesture, the gesture associated with the detected behavioral patterns, wherein the gesture enables a system output;
determining whether the subsequent input is associated with a negative driving behavior;
monitoring a subsequent input, wherein the subsequent input is associated with a contradictory output canceling one of the system output; and
initiating a self-healing action based on the subsequent input being associated with the contradictory output and based on whether the subsequent input is associated with the negative driving behavior, wherein the self-healing action is associated with a desired vehicle output.

15. The system of claim 14, wherein the processor is further configured present the user with a plurality of options to customize the gestures.

16. The system of claim 14, wherein the processor is in further communication with a vehicle infotainment device.

17. The system of claim 16, wherein the processor can accept inputs from the infotainment device indicating the plurality of options selected by the user.

18. The system of claim 14, comprising initiating the self-healing action based on a Markovian process.

19. The system of claim 14, comprising initiating the self-healing action based on a threshold number of subsequent inputs being associated with the contradictory output canceling one of the system output.

20. The system of claim 14, comprising initiating the self-healing action based on a time of day or a percentage of time that the contradictory output is detected.

* * * * *